(12) United States Patent
Sakai et al.

(10) Patent No.: US 12,479,678 B2
(45) Date of Patent: Nov. 25, 2025

(54) PLACEMENT TRAY AND RECORDING DEVICE

(71) Applicant: SEIKO EPSON CORPORATION, Tokyo (JP)

(72) Inventors: Yohei Sakai, Matsumoto (JP); Kazutoshi Matsuzaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 160 days.

(21) Appl. No.: 18/396,436

(22) Filed: Dec. 26, 2023

(65) Prior Publication Data
US 2024/0208748 A1    Jun. 27, 2024

(30) Foreign Application Priority Data

Dec. 27, 2022 (JP) ................. 2022-209329
Sep. 4, 2023 (JP) ................. 2023-143097

(51) Int. Cl.
*B65H 1/08* (2006.01)
*B41J 13/03* (2006.01)
(Continued)

(52) U.S. Cl.
CPC ............... *B65H 1/08* (2013.01); *B41J 13/03* (2013.01); *B41J 13/103* (2013.01); *B65H 1/04* (2013.01); *B65H 3/5215* (2013.01); *B65H 3/5261* (2013.01); *B65H 2402/31* (2013.01); *B65H 2405/10* (2013.01); *B65H 2405/114* (2013.01);
(Continued)

(58) Field of Classification Search
CPC .......... B65H 1/08; B65H 1/04; B65H 3/5215; B65H 3/5261; B65H 2402/31; B65H 2405/10; B65H 2405/114; B65H 2405/324; B65H 2405/354; B65H 2407/20; B65H 2511/22; B65H 2801/06; B41J 13/03; B41J 13/103
See application file for complete search history.

(56) References Cited

U.S. PATENT DOCUMENTS

2010/0327510 A1* 12/2010 Matsuno ................ B65H 29/52
                                                      271/3.14
2014/0212195 A1*  7/2014 Aoyama ............ G03G 21/1695
                                                       399/405
(Continued)

FOREIGN PATENT DOCUMENTS

JP         2000-302297 A    10/2000

*Primary Examiner* — Henok D Legesse
(74) *Attorney, Agent, or Firm* — WORKMAN NYDEGGER

(57) ABSTRACT

A placement tray 50, which is displaceable to a closed state and an open state with respect to a device main body 34, has a placement surface 51 on which a medium is placed, edge guides 531, 532 that restrict side edges of the medium to be placed, and a link member 551 that supports the placement tray in the open state. The edge guide has a movable section 571 that pivotably switches between a non-use posture in which it reclines along the placement surface and a use posture in which it is upright against the placement surface, and an operation section 611 that is fixed in posture against the placement surface and is operated. At least a part of the operation section is provided at a position that overlaps the movable section and does not overlap the link member as viewed from the width direction that intersects the transport direction F of the medium.

16 Claims, 22 Drawing Sheets

(51) Int. Cl.
*B41J 13/10* (2006.01)
*B65H 1/04* (2006.01)
*B65H 3/52* (2006.01)

(52) U.S. Cl.
CPC .. *B65H 2405/324* (2013.01); *B65H 2405/354* (2013.01); *B65H 2407/20* (2013.01); *B65H 2511/22* (2013.01); *B65H 2801/06* (2013.01)

(56) References Cited

U.S. PATENT DOCUMENTS

| | | | |
|---|---|---|---|
| 2017/0001815 A1* | 1/2017 | Sai | B65H 1/04 |
| 2019/0062096 A1* | 2/2019 | Tanjo | B65H 31/22 |
| 2019/0146398 A1* | 5/2019 | Maeda | B65H 1/12 |
| | | | 271/8.1 |
| 2022/0185605 A1* | 6/2022 | Nitta | G03G 15/6529 |
| 2022/0281699 A1* | 9/2022 | Nishimura | B65H 1/12 |

* cited by examiner

PLACEMENT TRAY AND RECORDING DEVICE

The present application is based on, and claims priority from JP Application Serial Numbers 2022-209329, filed Dec. 27, 2022, and 2023-143097, filed Sep. 4, 2023, the disclosures of which are hereby incorporated by reference herein in their entirety.

BACKGROUND

1. Technical Field

The present disclosure relates to a placement tray and a recording device.

2. Related Art

An example of this type of device is described in JP-A-2000-302297. In JP-A-2000-302297, a configuration with a retractable edge guide on a manual feed tray is disclosed for space efficiency when the manual feed tray is not in use.

JP-A-2000-302297 describes a manual feed tray with a retractable edge guide. For this manual feed tray, there is room for improvement in operability when moving the edge guide.

SUMMARY

In order to solve the above problems, a placement tray according to this disclosure is a placement tray that is displaceable between a closed state and an open state with respect to a device main body, the placement tray comprising: a placement surface on which a medium is placed; an edge guide that restricts a side edge of the medium that is placed on the placement surface; and a link member that is connected to the device main body and that supports the placement tray in the open state, wherein the edge guide has a movable section that is configured to pivotably switch between a non-use posture in which in the closed state the movable section reclines along the placement surface and a use posture in which in the open state the movable section is upright with respect to the placement surface and an operation section that has a fixed posture with respect to the placement surface and that is operated by a user and at least a part of the operation section is provided in a position that overlaps the movable section and that does not overlap the link member as viewed from a width direction, which intersects a transport direction in which the medium is transported.

Further, a placement tray according to this disclosure is a placement tray that is displaceable between a closed state and an open state with respect to a device main body, the placement tray comprising: a placement surface on which a medium is placed; an edge guide that restricts a side edge of the medium that is placed on the placement surface; and a link member that is connected to the device main body and that supports the placement tray in the open state, wherein the edge guide has a movable section that is configured to pivotably switch between a non-use posture in which in the closed state the movable section reclines along the placement surface and a use posture in which in the open state the movable section is upright with respect to the placement surface and an operation section that has a fixed posture with respect to the placement surface and that is operated by a user and the movable section has a medium guide section having a guide surface that extends in a transport direction of the medium and that guides the medium being transported in the transport direction and a protruding contact portion that protrudes from the medium guide section so as to extend in an upright direction and that, when the open state is shifted to the closed state, switches the movable section from the use posture to the non-use posture by contacting a contacted portion of the device main body.

Further, the recording device according to this disclosure has a placement tray of a first aspect, which will be described later; a transport section that transports a medium placed on the placement tray; and a recording section that performs recording on the medium being transported by the transport section.

Further, the recording device according to this disclosure has a placement tray of a ninth aspect, which will be described later, a transport section that transports a medium placed on the placement tray; and a recording section that performs recording on the medium being transported by the transport section.

DESCRIPTION OF EMBODIMENTS

Figure 1:
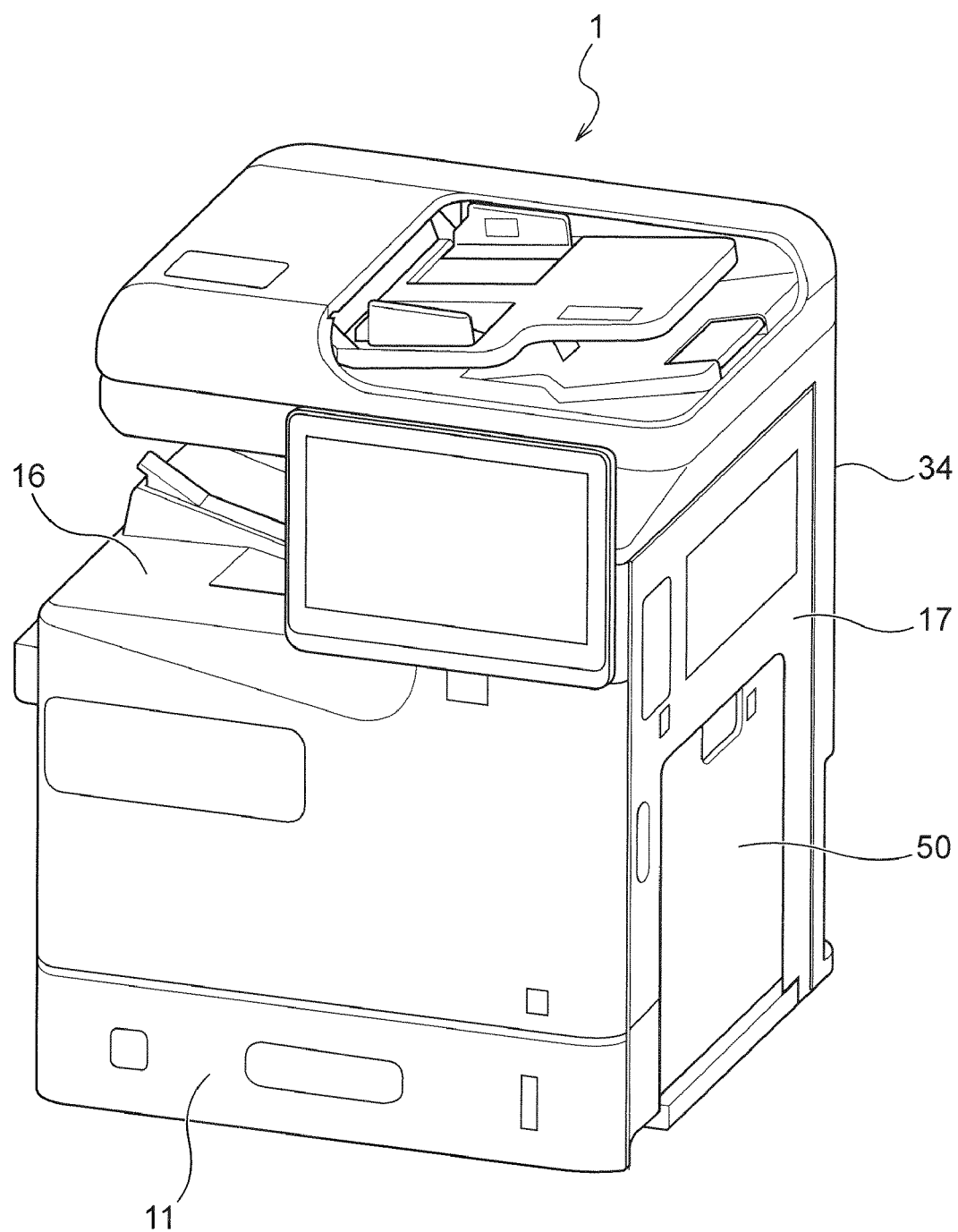
FIG. 1 is a perspective view of the external appearance of a recording device according to a first embodiment.

The following is a brief description of this disclosure. In order to solve the above problems, the first aspect of the placement tray according to this disclosure is a placement tray that is displaceable between a closed state and an open state with respect to a device main body, the placement tray comprising: a placement surface on which a medium is placed; an edge guide that restricts a side edge of the medium that is placed on the placement surface; and a link member that is connected to the device main body and that supports the placement tray in the open state, wherein the edge guide has a movable section that is configured to pivotably switch between a non-use posture in which in the closed state the movable section reclines along the placement surface and a use posture in which in the open state the movable section is upright with respect to the placement surface and an operation section that has a fixed posture with respect to the placement surface and that is operated by a user and at least a part of the operation section is provided in a position that overlaps the movable section and that does not overlap the link member as viewed from a width direction, which intersects a transport direction in which the medium is transported.

According to this aspect, at least a part of the operation section is provided in a position that overlaps the movable section and that does not overlap the link member as viewed from a width direction, which intersects a transport direction in which the medium is transported. By this, the operation section can have an exposed portion that does not overlap with the link member as viewed from the width direction. Therefore, the user can easily see this operation section, which makes it easier to grip.

A second aspect of the placement tray in this disclosure is an aspect depending on the first aspect, wherein the placement tray is located on a side surface of the device main body and the edge guide, which has the operation section to be operated by the user, is provided on a front surface side of the device main body in a depth direction, which is from the front surface to a rear surface.

Users often operate the edge guide from the front surface side of the device main body. According to this aspect, the edge guide, which has the operation section to be operated by the user, is provided on a front surface side of the device main body in a depth direction, which is from the front surface to a rear surface. By this, the user can see and operate the operation section from the front surface side of the device main body. Therefore, the user can easily grip the operation section, and the user's operability improves.

A third aspect of the placement tray according to this disclosure is an aspect depending on the first aspect, wherein at least a part of the link member corresponding to the operation section to be operated by the user is located further downstream in the transport direction than is the operation section, as viewed from the width direction.

According to this aspect, at least a part of the link member corresponding to the operation section to be operated by the user is located further downstream in the transport direction than is the operation section, as viewed from the width direction. By this, the user's hand and the link member are less likely to interfere with each other when the user grips the operation section. Thus, the user's operability improves.

A fourth aspect of the placement tray according to this disclosure is an aspect depending on the first aspect, wherein the link member corresponding to the operation section to be operated by the user has a curved section that curves toward the transport direction, as viewed from the width direction.

When considering the support strength of the placement tray by the link member, it is desirable that the connection position where the link member connects with the placement tray is on the upstream side in the transport direction. However, in such cases, the link member and the operation section may overlap or the device may become larger. According to this aspect, the link member corresponding to the operation section, which is operated by the user, has the curved section that curves toward the transport direction, as viewed from the width direction. By this, it is possible to achieve a structure that does not overlap with the operation section while improving the design freedom of the connection position where the link member and the placement tray are connected.

A fifth aspect of the placement tray according to this disclosure is an aspect depending on the first aspect, wherein when the movable section is in the use posture, the operation section supports a posture of the movable section by contacting the movable section.

According to this aspect, when the movable section is in the use posture, the operation section supports the posture of the movable section by contacting the movable section. By this, the posture of the movable section is stabilized because the operation section supports the posture of the movable section.

A sixth aspect of the placement tray according to this disclosure is an aspect depending on the first aspect, wherein the movable section has a restriction section that restricts a top surface of the medium placed on the placement surface and when the placement tray switches to the closed state, the restriction section contacts the device main body, which switches the movable section from the use posture to the non-use posture.

According to this aspect, when the placement tray switches to the closed state, the restriction section contacts the device main body, which switches the movable section from the use posture to the non-use posture. By this, the user does not need to switch the posture of the movable section, which makes the operation section easier to operate. In addition to the original function of the restriction section, the restriction section can also have the function of changing the posture of the movable section. Therefore, device can be downsized without increasing the number of parts.

A seventh aspect of the placement tray according to this disclosure is an aspect depending on the sixth aspect, wherein when the placement tray switches to the closed state, a portion of the movable section that is different from the restriction section contacts a main body convex portion of the device main body, which moves the edge guide to a position facing a concave portion provided in the device main body.

According to this aspect, when the placement tray is switched to the closed state, the portion of the movable section that is different from the restriction section contacts the main body convex portion of the device main body, and the edge guide moves to the position facing the concave portion provided in the device main body. By this, when the edge guide is stowed, the edge guide moves to the position facing the concave portion of the device main body. Therefore, even if the device main body has the main body convex portion, it is possible to achieve downsizing of the device when it is stowed.

An eighth aspect of the placement tray according to this disclosure is an aspect depending on the sixth aspect, wherein the restriction section has a notch portion that is cut out along the transport direction.

According to this aspect, the restriction section has the notch portion that is cut out along the transport direction. Therefore, when the user grips and operates the movable section and the operation section, the notch portion can suppress the restriction section from interfering with the user's hand.

A ninth aspect of the placement tray according to this disclosure is a placement tray that is displaceable between a closed state and an open state with respect to a device main body, the placement tray comprising: a placement surface on which a medium is placed; an edge guide that restricts a side edge of the medium that is placed on the placement surface; and a link member that is connected to the device main body and that supports the placement tray in the open state, wherein the edge guide has a movable section that is configured to pivotably switch between a non-use posture in which in the closed state the movable section reclines along the placement surface and a use posture in which in the open state the movable section is upright with respect to the placement surface and an operation section that has a fixed posture with respect to the placement surface and that is operated by a user and the movable section has a medium guide section having a guide surface that extends in a transport direction of the medium and that guides the medium being transported in the transport direction and a protruding contact portion that protrudes from the medium guide section so as to extend in an upright direction and that, when the open state is shifted to the closed state, switches the movable section from the use posture to the non-use posture by contacting a contacted portion of the device main body.

According to this aspect, the movable section has the medium guide section and the protruding contact portion that extends from the medium guide section in the upright direction. The protruding contact portion switches the movable section from the use posture to the non-use posture by contacting the contacted portion of the device main body when the placement tray is shifted from the open state to the closed state. In this way, the user does not need to switch postures, which improves user operability. Further, since the movable section is comprised of the medium guide section and the protruding contact portion, it is possible to downsize the movable section, that is, the edge guide, while maintaining its guide function as the edge guide. In addition, by matching the movable section with the concavo-convex shape of the device main body, it is easy to achieve an overall downsizing of the device.

A tenth aspect of the placement tray according to this disclosure is an aspect depending on the ninth aspect, wherein the operation section has a base section to which an end portion of the operation section is fixed and is provided in a position that overlaps the movable section as viewed from a width direction that intersects the transport direction and the movable section is pivotably attached to the base section.

According to this aspect, the operation section has the base section to which the end portion of the operation section is fixed and is provided in the position that overlaps the movable section as viewed from the width direction that intersects the transport direction. In this way, as viewed from the width direction, the operation section is located in the position that overlaps the movable section so that it is easy for the user to grip and operate the edge guide when the user manually moves the edge guide.

An eleventh aspect of the placement tray according to this disclosure is an aspect depending on the tenth aspect, wherein the device main body has a main body convex portion at a position that, when the movable section is switched from the use posture to the non-use posture, does not contact the protruding contact portion and that contacts the medium guide section and when the use posture switches to the non-use posture, the medium guide section contacts the main body convex portion, which, by adding to the displacement by pivoting, retracts the base section, which switches the movable section to the non-use posture.

According to this aspect, when the use posture switches to the non-use posture, the medium guide section contacts the main body convex portion, which, by adding to the displacement by pivoting, retracts the base section, which switches the movable section to the non-use posture. By this, even if the device main body has the main body convex portion, the movable section retracts to avoid the main body convex portion and changes to the non-use posture. Thus, the user's operability can be improved and the size of the device can be reduced.

A twelfth aspect of the placement tray according to this disclosure is an aspect depending on the tenth aspect, wherein the operation section has a contact portion that is configured to contact the link member and, when the placement tray moves from the open state to the closed state, the link member pushes the contact portion, which advances and moves the base section.

In some cases, a convex portion that protrudes toward the placement tray may be located close to the link member in the device main body. In case the placement tray is shifted from the open state to the closed state while the edge guide is in a position close to the link member, there is a possibility that the edge guide cannot be shifted from the use posture, in which the edge guide is upright, to the non-use posture, in which the edge guide recline, due to interference between the edge guide and the convex portion of the device main body. However, according to this aspect, when the placement tray shifts from the open state to the closed state, the link member pushes the contact portion, and the base section advances and moves. By this advance and move, the edge guide can be moved to a position where the edge guide does not interfere with the convex portion. Thus, even when the placement tray is shifted from the open state to the closed state while the edge guide is in the position close to the link member, the edge guide can be shifted to the non-use posture, avoiding interference with the convex portion.

A thirteenth aspect of the placement tray according to this disclosure is an aspect depending on the first aspect, the placement tray further has a raising and lowering section that raises and lowers the medium toward the feed roller provided in the device main body and an auxiliary support member that is provided upstream of the raising and lowering section in the transport direction, and that supports the placement surface and the medium that is placed on the placement surface, wherein in conjunction with displacement of the placement tray from the open state to the closed state, the auxiliary support member switches from an expanded posture to a stowed posture.

According to this aspect, the placement tray has the raising and lowering section and the auxiliary support member, and in conjunction with the displacement of the placement tray from the open state to the closed state, the auxiliary support member switches from the expanded posture to the stowed posture. By this, even if the raising and lowering section is downsized and a gap is created between the placement tray and the raising and lowering section, this gap can be covered by the auxiliary support member, and the possibility of the medium falling into the gap can be reduced. Further, since the auxiliary support member switches from the expanded posture to the stowed posture, when the placement tray is shifted to the closed state, that is, when it is stowed, the auxiliary support member switches to the stowed posture. Therefore, operability can be improved and the device can be downsized.

A fourteenth aspect of the placement tray according to this disclosure is an aspect depending on the ninth aspect, the placement tray further has a raising and lowering section that raises and lowers the medium toward the feed roller provided in the device main body and an auxiliary support member that is provided upstream of the raising and lowering section in the transport direction, and that supports the placement surface and the medium that is placed on the placement surface, wherein in conjunction with displacement of the placement tray from the open state to the closed state, the auxiliary support member switches from an expanded posture to a stowed posture.

According to this aspect, the same effect as the thirteenth aspect can be obtained.

An aspect of a recording device according to this disclosure has the placement tray according to the first aspect; a transport section that transports a medium placed on the placement tray; and a recording section that performs recording on the medium being transported by the transport section. According to this aspect, the recording device can obtain the effect obtained in the aspect of the placement tray.

Further, an aspect of the recording device according to this disclosure has the placement tray according to the ninth aspect; a transport section that transports a medium placed on the placement tray; and a recording section that performs recording on the medium being transported by the transport section. According to this aspect, the recording device can obtain the effect obtained in the aspect of the placement tray.

EMBODIMENTS

The following is a specific description based on the figures, of an embodiment of a placement tray according to the disclosure and a recording device such as an inkjet printer equipped with this placement tray. In the following description, three axes orthogonal to each other are an X-axis, a Y-axis, and a Z-axis, as shown in figures. The direction indicated by the arrows of the three axes (X, Y, Z) is the + direction for each direction, and the opposite direction is the – direction. The Z-axis direction corresponds to the vertical direction, that is, a direction in which gravity acts. The +Z direction indicates a vertically upward direction, and the –Z direction indicates a vertically downward direction. The X-axis direction and the Y-axis direction correspond to horizontal directions. The +Y direction indicates the front direction of the device, and the –Y direction indicates the rear direction of the device. The +X direction indicates the right direction of the device, and the –X direction indicates the left direction of the device.

First Embodiment

Recording Device

Figure 2:
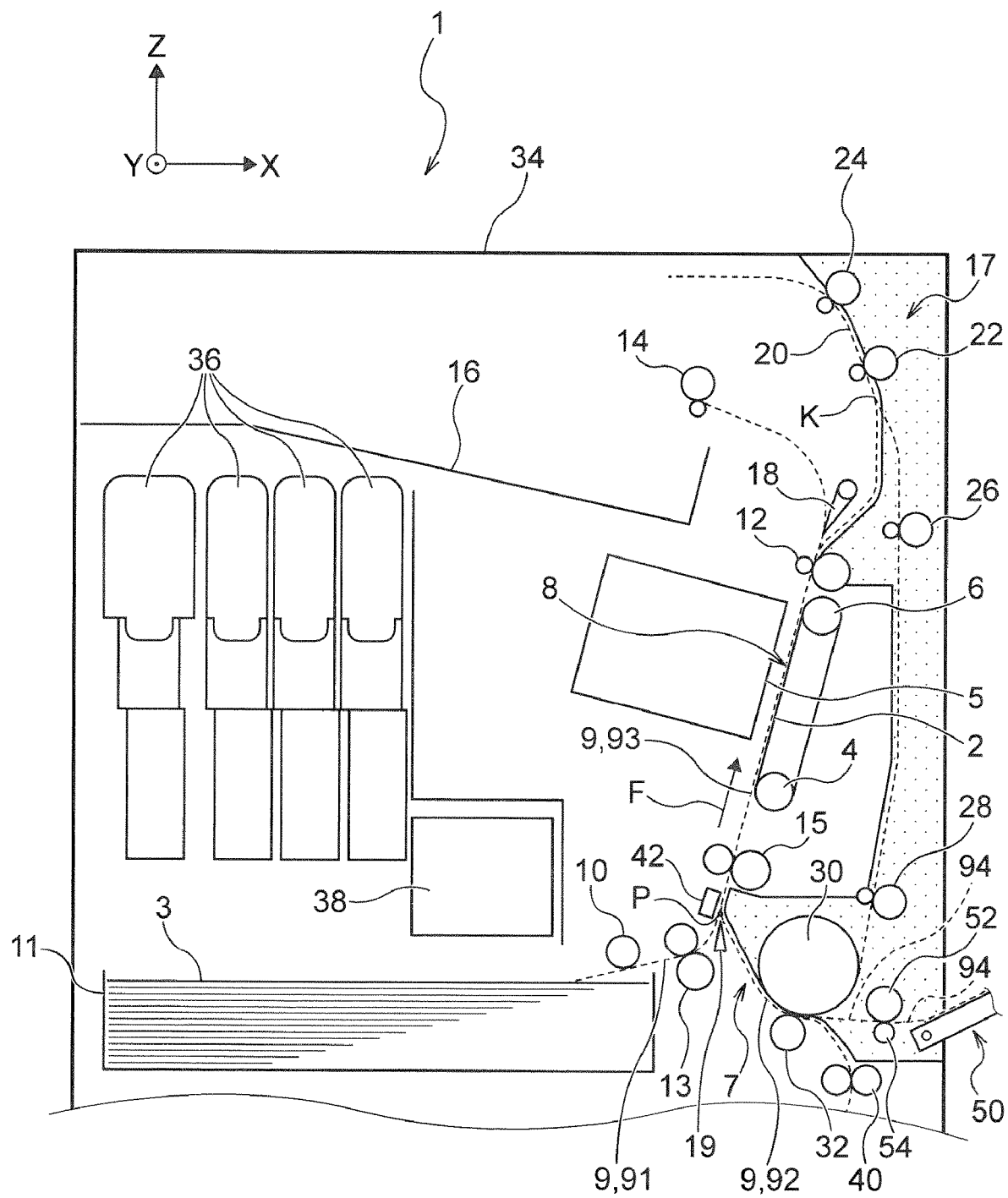
FIG. 2 is a diagram showing an internal structure of the recording device according to the first embodiment.

The recording device 1 according in this embodiment is an inkjet printer, as an example. As shown in FIGS. 1 and 2, this recording device 1 is equipped with a transport section 7 that transports a medium 3 placed on a placement tray 50, a recording section 5 that performs recording on the medium 3 such as a paper sheet transported by the transport section 7, and a medium accommodation section 11. The operation of performing recording on the medium 3 by the recording section 5 and the operation of transporting the medium 3 by the medium transport device are performed by a control section (not shown). Here, the control section is equipped with a CPU, a flash ROM, and a RAM. The CPU performs various operation processes according to a program stored in the flash ROM and controls the operation of the entire recording device 1. The flash ROM, which is an example of a storage device, is a nonvolatile memory that can be read from and written to. The RAM, which is an example of a storage device, temporarily stores various types of information. The recording section 5 is a line head in this example, but it can also be a serial type head or other type of head that reciprocates in the width direction (Y-axis direction) of the medium 3. The platen that supports the medium 3 in a recording execution region 8 of the recording section 5 is here an endless transport belt 2. The transport belt 2 is wound around pulleys 4, 6, and the rotation of both pulleys 4, 6 causes the transport belt 2 to rotate, which in turn transports the medium 3 in a transport direction F. The transport belt 2 forms a part of a transport path 9 through which the medium 3 is transported.

This recording device 1 has a door section 17 that forms part of the device main body 34, as shown in FIGS. 1 and 2. The door section 17 is configured to open and close by pivoting in the horizontal direction. The door section 17 has a pivoting shaft (not shown) at an end portion in the –Y direction in FIGS. 1 and 2, and the door section 17 pivots around this pivoting shaft as a pivot point. When the door section 17 is opened, the transport path 9 is exposed to allow the user to remove a clogged medium 3, that is, a jam.

In this recording device 1, the medium 3 picked up by the pickup roller 10 from the cassette-type medium accommodation section 11, which accommodates the medium 3 such as paper sheets, is transported by the feed roller pair 13 in the transport direction F along the first transport path 91. Note that, unless otherwise explained, "roller pair" hereafter is composed of a drive roller, which is driven by a motor (not shown), and a driven roller, which contacts the drive roller and rotates driven by the drive roller. The second transport path 92 joins the first transport path 91 at a position downstream of the feed roller pair 13 in the first transport path 91. The transport path 9, which is located further to the recording section 5 side than is a junction point P of the first transport path 91 and the second transport path 92, will be described below as the third transport path 93.

A switching section 19 is located at the junction point P. The switching section 19 is configured to be displaceable between a first state in which the first transport path 91 is open and a second state in which the second transport path 92 is open. That is, when the medium 3 is to be transported on the first transport path 91 in the transport direction F, the switching section is configured to take a position that enables this transportation, and when the medium 3 is to be transported on the second transport path 92 in the transport direction F, the switching section is configured to take a position that enables this transportation. In this embodiment, the switching section 19 is configured to be displaceable between the first state and the second state when the door section 17 is closed.

A transport roller pair 15 is located between the junction point P and the recording section 5. The medium 3 is transported by the transport roller pair 15 in the transport direction F along the third transport path 93. In the case of single-sided recording, where only the front surface of medium 3 is recorded, recording is performed on the front surface of the medium 3 in the recording execution region 8, and the medium 3 is discharged to the discharge tray 16 by the transport force of the transport roller pairs 12, 14. For double-sided recording, the medium 3 is led to the switchback path 20 by a flap 18, which is at the downstream position from the transport roller pair 12. Transport roller pairs 22, 24 are disposed in the switchback path 20. The medium 3 led to the switchback path 20 is led to the second transport path 92, which is an inversion path, by a guide member (not shown) at a branch point K, as the transport roller pairs 22, 24 are controlled to rotate in reverse. Transport roller pairs 26, 28, an inversion roller 30, and a driven roller 32, which is paired with the inversion roller 30, are located in the second transport path 92.

As described above, the first transport path 91 is a feed path that feeds the medium 3 accommodated in the medium accommodation section 11 to the third transport path 93, the second transport path 92 is an inversion path that inverts the recorded medium 3 that has been recorded by the recording section 5 and transports it to the third transport path 93, and the third transport path 93 is the transport path that includes the recording position of the recording section 5 where recording is performed. In FIG. 2, symbol 36 indicates ink containers as a plurality of medium accommodation sections. Each ink container 36 is detachably mounted. Ink to be ejected from the recording section 5 is supplied to the recording section 5 via tubes (not show) from each ink container 36. The symbol 38 indicates a waste liquid container. The symbol 42 indicates a detection section. The detection section 42 detects the presence or absence of the medium 3 in the inversion path 92 and also detects the width of the medium 3 by detecting the end portions of the medium 3 in the width direction (Y-axis direction). The recording device 1 also has other medium accommodation sections (not shown) below the medium accommodation section 11. The medium 3 in the other medium accommodation section is also picked up by the pickup roller and is joined by the transport roller pair 40 to the second transport path 92 that is upstream from the nip position of the inversion roller 30.

Placement Tray

Figure 3:
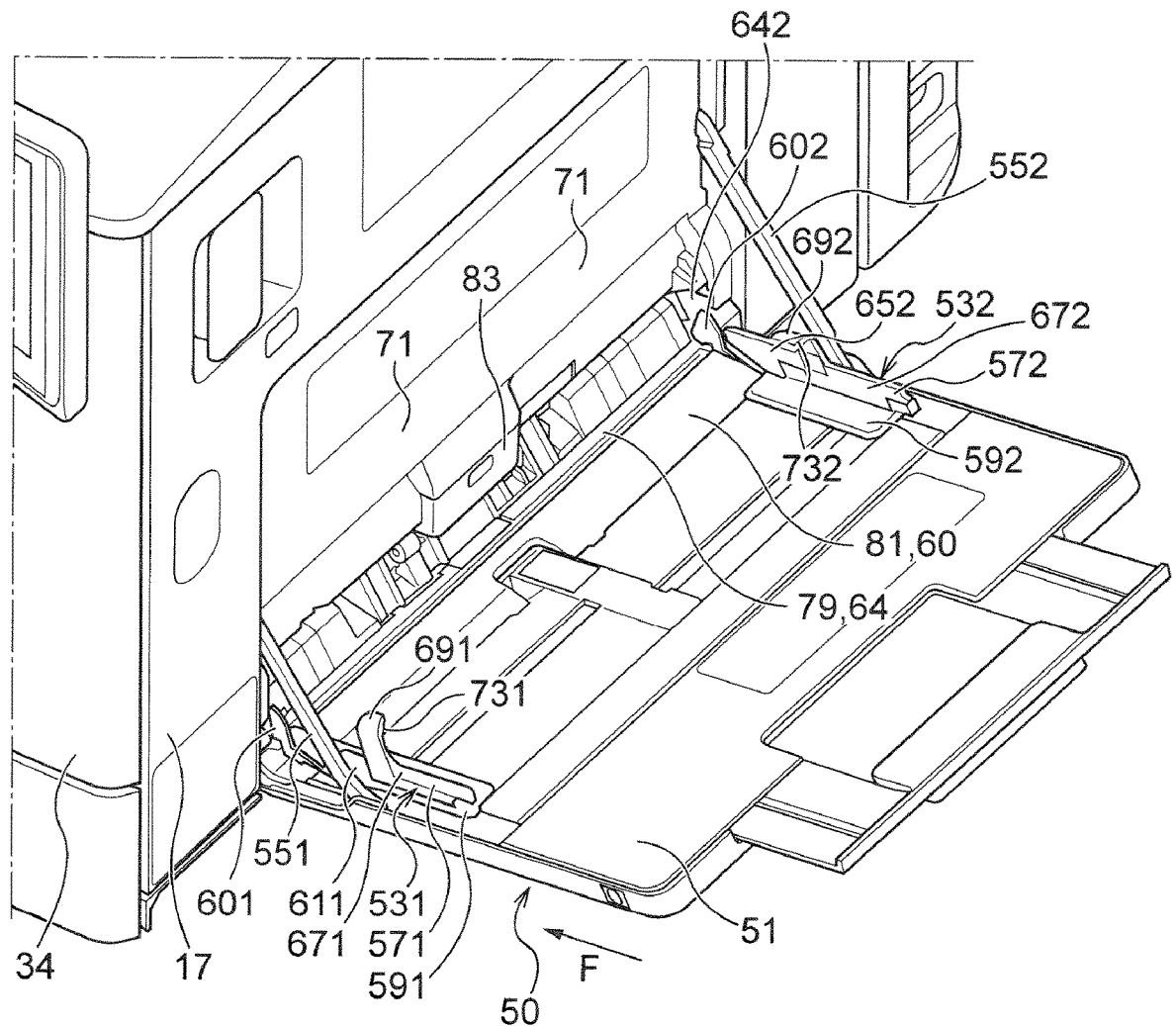
FIG. 3 is a perspective view of a main part of the placement tray in an open state in the first embodiment.
Figure 4:
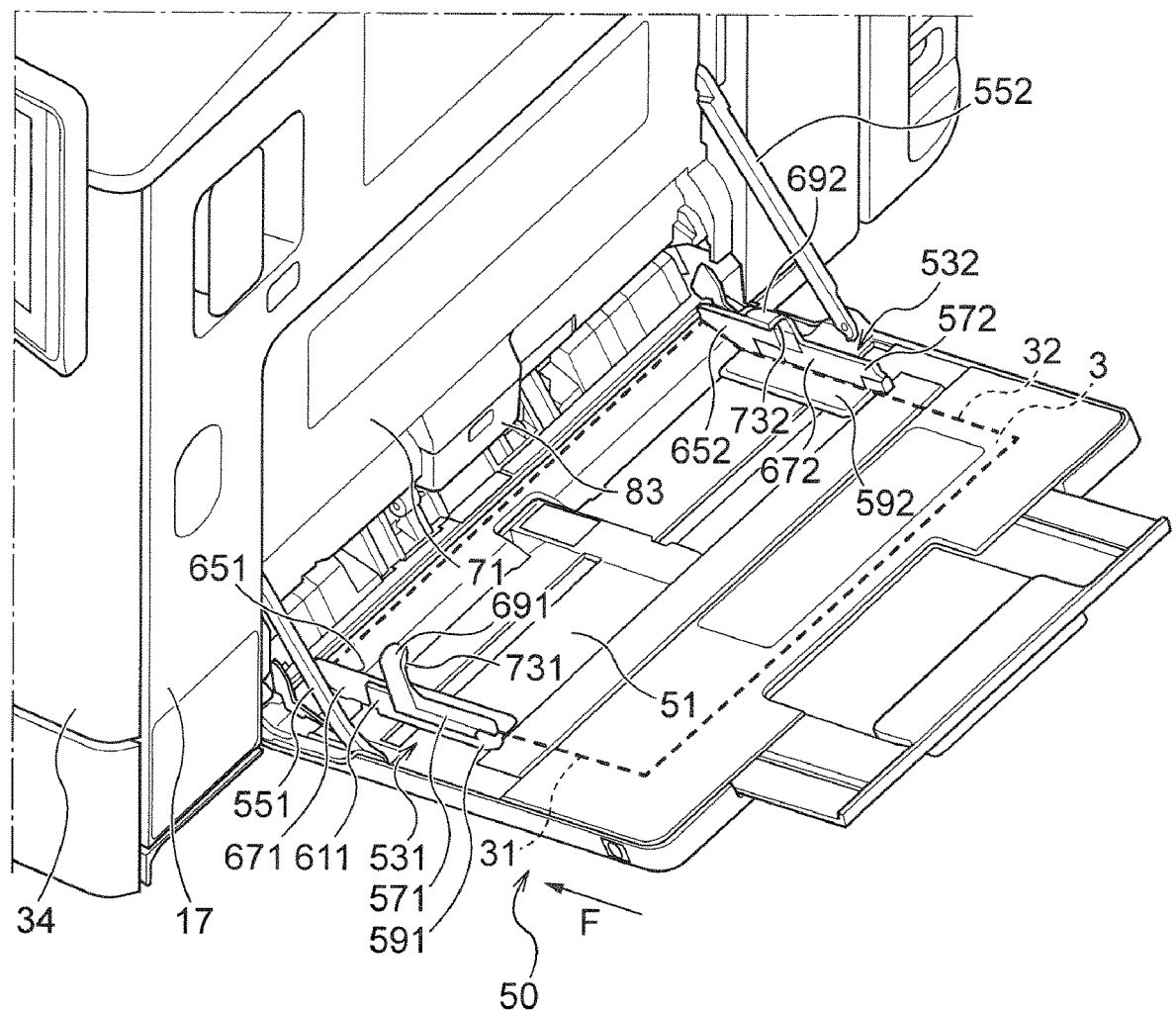
FIG. 4 is another perspective view of the main part of the placement tray in the open state in the first embodiment.

As shown in FIGS. 1 to 4, the placement tray 50, also referred to as the manual feed tray, is provided in the device main body 34, which is displaceable between a closed state (FIG. 1) and an open state (FIGS. 2, 3, and 4), in this embodiment. Here, the placement tray 50 is pivotably provided on the door section 17, which is located on the side panel of the device main body 34, with the lower end portion of the placement tray as the pivot point and the upper portion as the free end. The medium 3 placed on the placement tray 5 in the open state as shown in FIG. 4 is separated one by one by, as shown in FIG. 2, a pair of the feed roller 52 and the separation roller 54 and transported along the transport path 94. The transported medium 3 is sent to the second transport path 92 at the front of the inversion roller 30 and is transported in the transport direction F. As shown in FIGS. 3 to 9, the placement tray 50 has a placement surface 51 on which the medium 3 is placed, a pair of edge guides 531, 532 that contact the side edges 31, 32 (FIG. 4) of the medium 3 placed on the placement surface 51 and that restrict its position, a pair of link members 551, 552, which are connected to the device main body 34 and support the placement tray 50 in the open state.

Figure 8A:
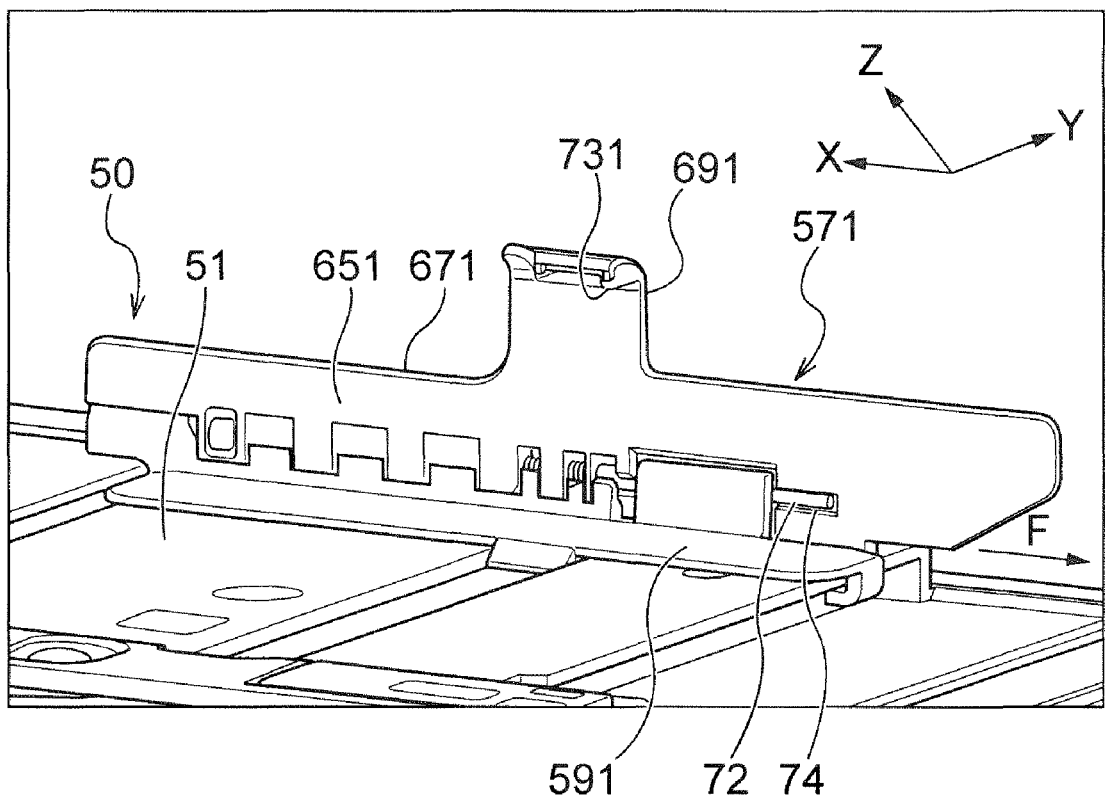
FIG. 8A is a key perspective view showing a structure of the movable section of the first embodiment.
Figure 8B:
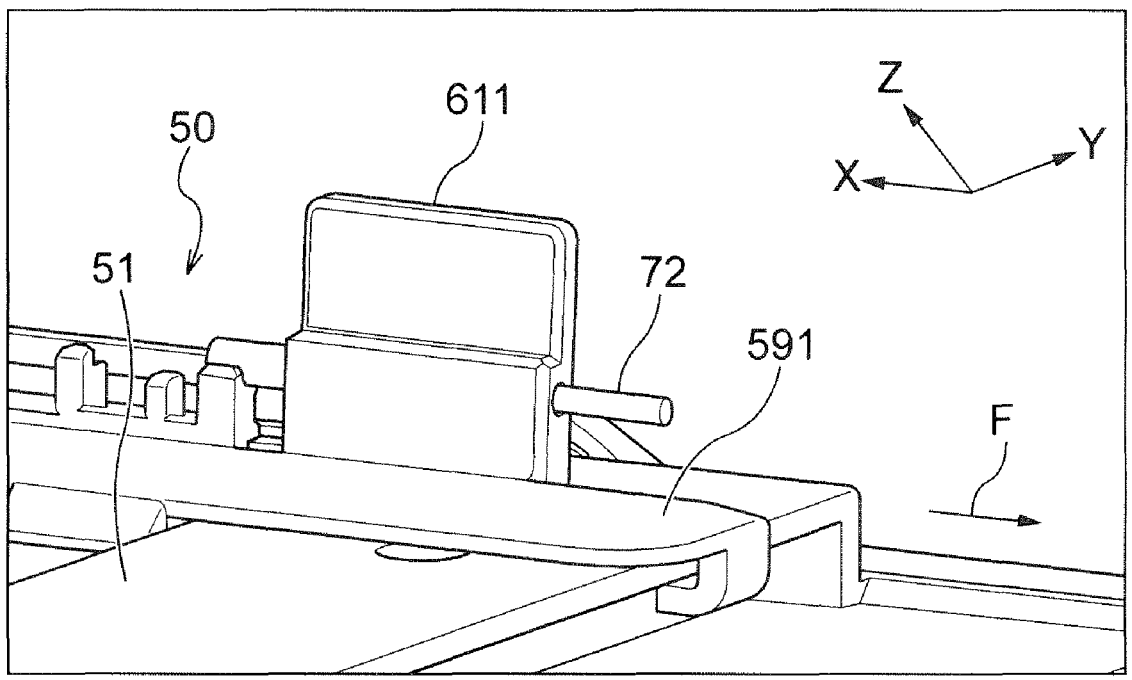
FIG. 8B is another key perspective view showing the structure of the movable section of the first embodiment.

The edge guides 531, 532 have movable sections 571, 572 and base sections 591, 592. The movable sections 571, 572 are attached to the base sections 591, 592 so that the movable sections 571, 572 can pivotably switch between a non-use posture (FIG. 7B), in which the movable sections 571, 572 recline along the placement surface 51 when the placement tray 50 is in the closed state, and a use posture (FIG. 7A), in which the movable sections 571, 572 are upright against the placement surface 51 when the placement tray 50 is in the open state. Specifically, the movable sections 571, 572 are pivotably attached to the base sections 591, 592 by shaft sections 68, 70, which are the end portions of the movable sections 571, 572 and serve as pivot points. In this embodiment, elastic members such as torsion coil springs (not shown) are attached to the shaft sections 68, 70, and the movable sections 571, 572 receive a force to maintain the use posture by the elastic force of these elastic members. That is, the movable sections 571, 572 are configured to return to the use posture by the elastic force of the elastic members when they are released from the restraining force that puts them in the non-use posture. Note that the movable sections 571, 572 may be configured without the elastic members, so that the movable sections 571, 572 can be manually switched between the use posture and the non-use posture. Note that, as shown in FIGS. 8A and 8B, it may be configured that a pin 72 is fixed to the base section 591 and the movable section 571 is provided with an engaged portion 74 with which the pin 72 engages, and when the movable section 571 is in use posture (FIG. 8A), the pin 72 engages the engaged portion 74 and restricts the movable section 591 from moving in a direction that intersects the placement surface 51. A similar configuration may be provided in the edge guide 532.

Figure 5:
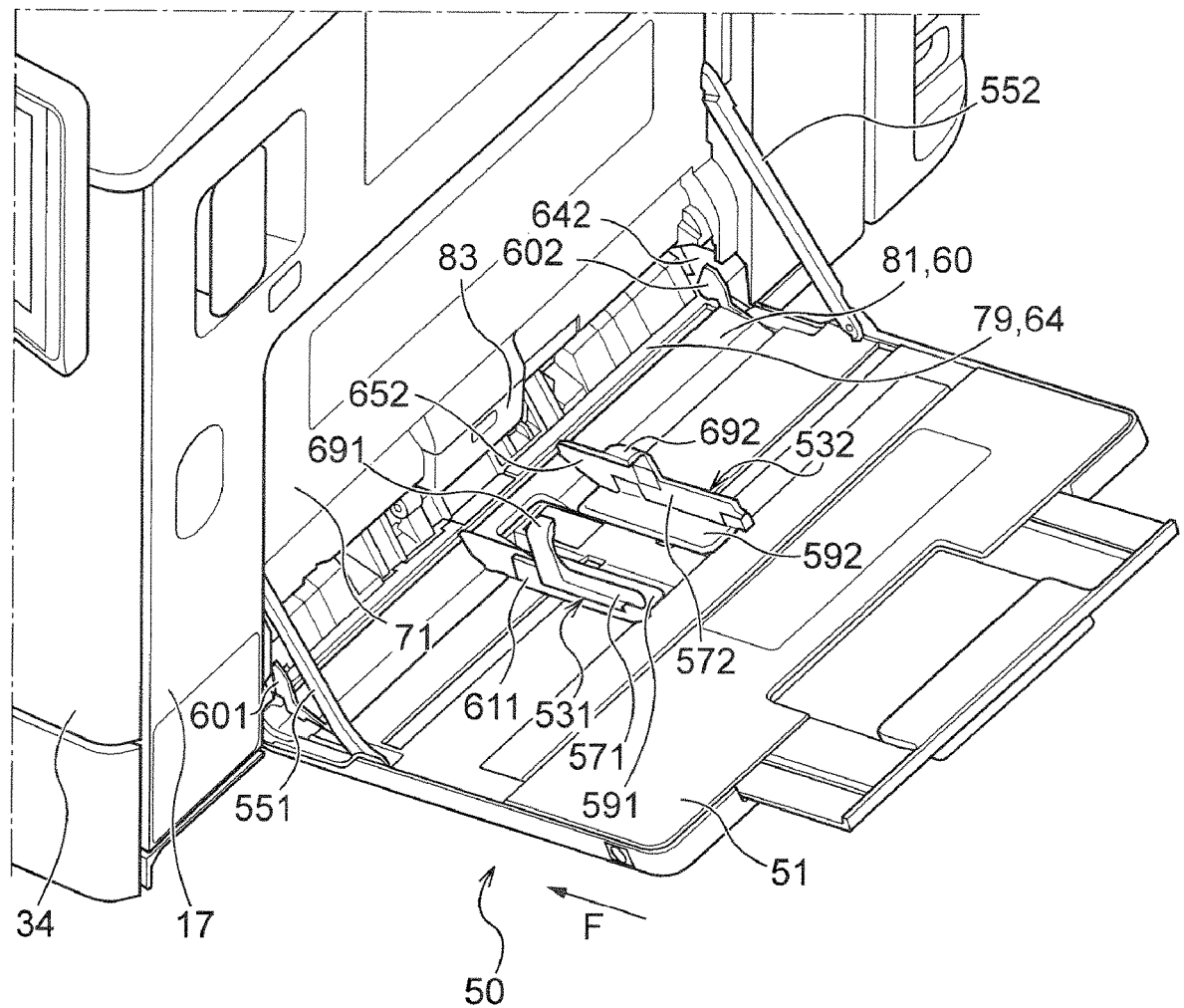
FIG. 5 is still another perspective view of the main part of the placement tray in the open state in the first embodiment.

The base sections 591, 592 are configured to be movable in approaching and separating directions (Y-axis directions) toward and away from each other on the placement surface 51. By this, the edge guides 531, 532 are movable in the directions approaching and separating each other. This movement mechanism in the approaching and separating directions is realized by a well-known rack-and-pinion mechanism (not shown). Here, when the user moves one of the pair of edge guides 531, 532, the other is also automatically moved by the rack-and-pinion mechanism described above. FIG. 3 shows a state in which the edge guide 531 and the edge guide 532 are at their most distant positions. FIG. 4 shows a state in which the edge guide 531 and the edge guide 532 are positioned a little closer than they are in FIG. 3. FIG. 5 shows a state in which the edge guide 531 and the edge guide 532 are positioned closest to each other.

As shown in FIGS. 6A, 6B, 7A, and 7B, the base sections 591, 592 have operation sections 611, 612 fixed in an upright posture with respect to the placement surface 51. The operation sections 611, 612 are the portions that are operated manually by the user when moving the edge guides 531, 532 in the approaching and separating directions, to match the width dimension of the medium 3 to be placed on the placement surface 51. In this embodiment, when the movable sections 571, 572 are in the use posture, the operation sections 611, 612 are in contact with the movable sections 571, 572. That is, the operation sections 611, 612 are configured to support the use posture of the movable sections 571, 572 by contacting the movable sections 571, 572 in the use posture.

Figure 6A:
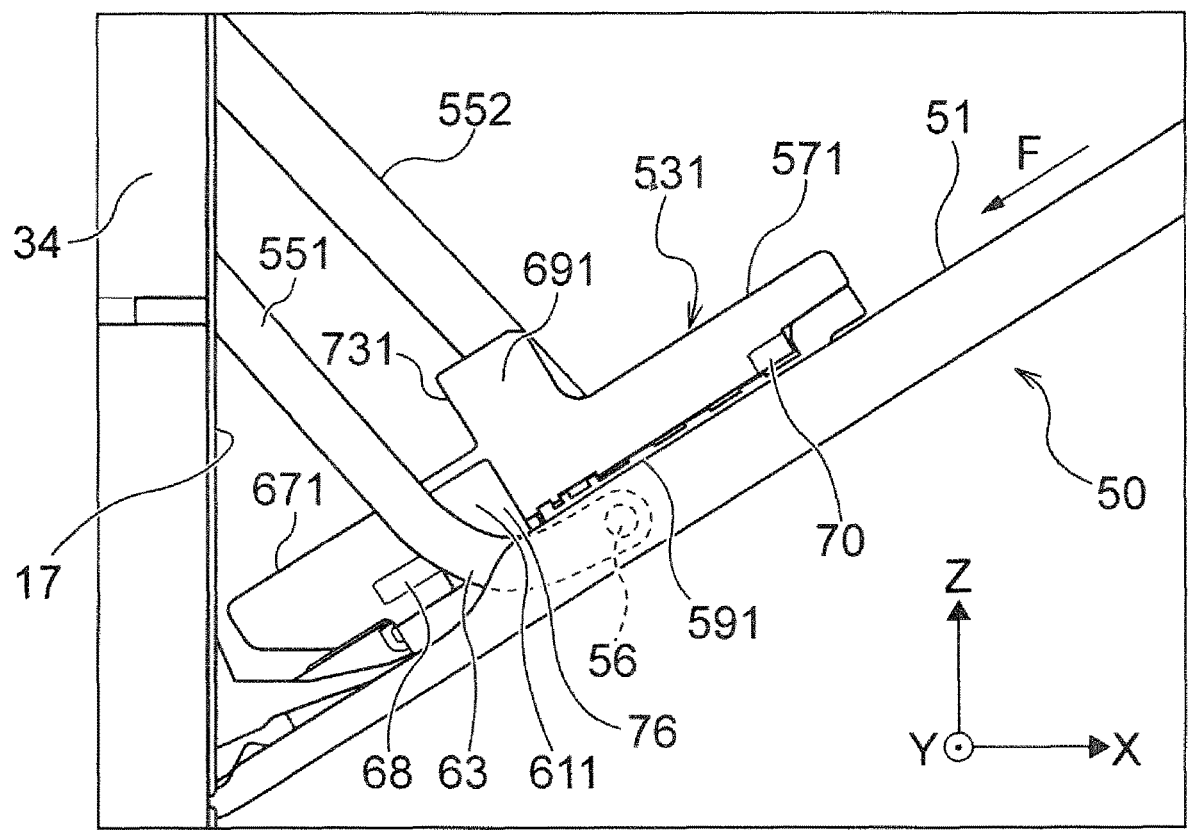
FIG. 6A is a side view of a main part when the placement tray is in the open state in the first embodiment.
Figure 6B:
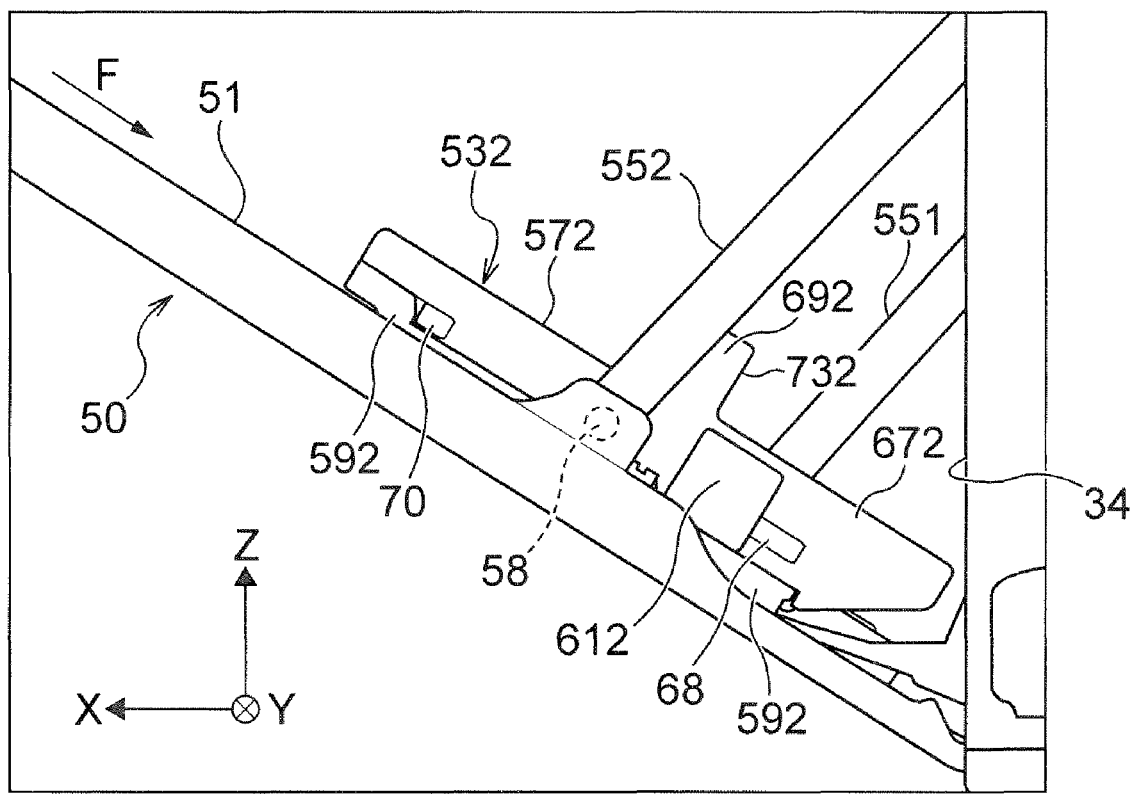
FIG. 6B is another side view of the main part when the placement tray is in the open state in the first embodiment.
Figure 7A:
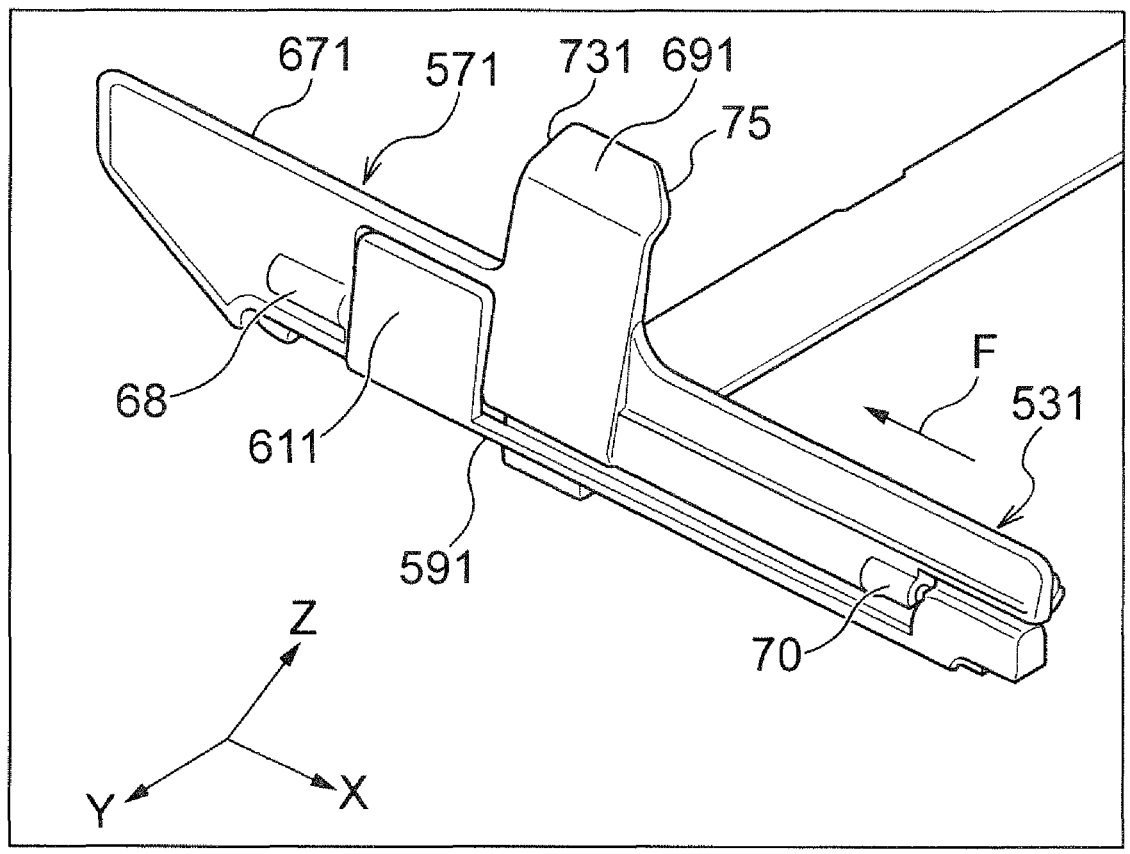
FIG. 7A is a perspective view of a main part for explaining a posture change of a movable section of an edge guide in the first embodiment.
Figure 7B:
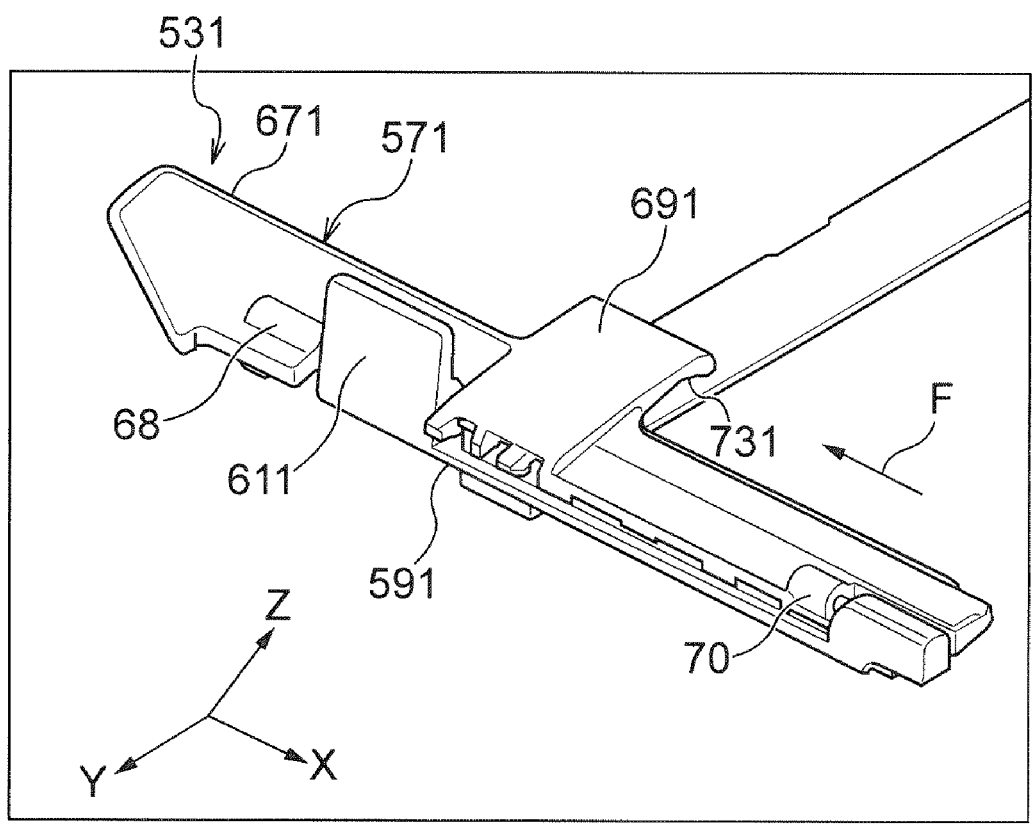
FIG. 7B is another perspective view of the main part for explaining the posture change of the movable section of the edge guide in the first embodiment.

As shown in FIGS. 6A and 6B, the operation sections 611, 612 are provided in positions that overlap the movable sections 571, 572 as viewed from the width direction (Y-axis direction), which intersects the transport direction F in which medium 3 is transported. Further, as shown in FIG. 6A, in this embodiment, one operation section 611 is located toward the front side (+Y direction) of the device main body 34 with respect to the depth direction (Y-axis direction), which is from the front surface to the rear surface and at least a portion of the operation section 611 does not overlap with the link member 551. In other words, as viewed from the width direction (Y-axis direction), the one operation section 611 is not entirely hidden by the link member 551, but is located at least partially exposed. Since the operation section 611 is located on the front surface side of the device main body 34, the user naturally reaches for the operation section 611 and operates the operation section 611 to move the edge guides 531, 531 in the approaching and separating directions. During that movement operation, even if the link member 511 is located in front of the operation section 611, the user can easily operate the operation section 611 because of an exposed portion 76. In this embodiment, as shown in FIG. 6B, the other operation section 612, which is located on the rear surface side (−Y direction) in the depth direction (Y-axis direction), is located in a position that does not overlap with the link member 552 at all. Note that the operation section 612, similar to the operation section 611, may also be provided at a position that does not overlap at least a portion of the link member 552.

As shown in FIGS. 6A and 6B, the link member 552 is located further upstream in the transport direction F than is the link member 551. This upstream arrangement allows link member 552 to support placement tray 50 more firmly than link member 551, in the open state of placement tray 50. In FIGS. 6A and 6B, symbols 56 and 58 indicate shafts. The ends of the link members 551, 552 are connected to the placement tray 50 through the shafts 56, 58. The respective end portions of the link members 551, 552 are connected to the device main body 34 by a known structure. The placement tray 50 is configured to switch between the open state and closed state by using the aforementioned connection structure with the link members 551, 552.

As shown in FIG. 6A, in this embodiment, the link member 551 corresponding to the operation section 611 is located downstream side of the operation section 611 in the transport direction F as viewed from the width direction. In other words, as viewed from the width direction, a portion of the operation section 611 is located further upstream than the link member 551 in the transport direction F. Further, as viewed from the width direction, the link member 551 has a curved section 63 that curves toward the transport direction F. Note that the shaft 56 and the shaft 58 are located at the same position in the transport direction F. That is, by the link member 551 including the curved section 63, the link member 551 overlaps with the downstream side of the operation section 611, but not with the upstream side of the operation section 611, thus forming the exposed portion 76.

In this embodiment, as shown in FIGS. 6A, 6B, 7A, 7B, and 9, the movable sections 571, 572 have medium guide sections 671, 672 having guide surfaces 651, 652 that extend in the transport direction F and guide the transported medium 3 in the transport direction F. Further, the movable sections 571, 572 have protruding contact portions 691, 692 that extend from the medium guide sections 671, 672 in the upright direction. In this embodiment, as shown in FIGS. 6A and 6B, the protruding contact portions 691, 692 are located substantially at the center of the medium guide sections 671, 672 in the transport direction F. In other words, the medium guide sections 671, 672 exist both upstream side and downstream side of the protruding contact portions 691, 692 in the transport direction F. When the placement tray 50 shifts from the open state to the closed state, the protruding contact portions 691, 692 switch the movable sections 571, 572 from the use posture (FIG. 7A) to the non-use posture (FIG. 7B) by contacting the contacted portion 71 (FIG. 3) of the device main body 34.

Figure 9:
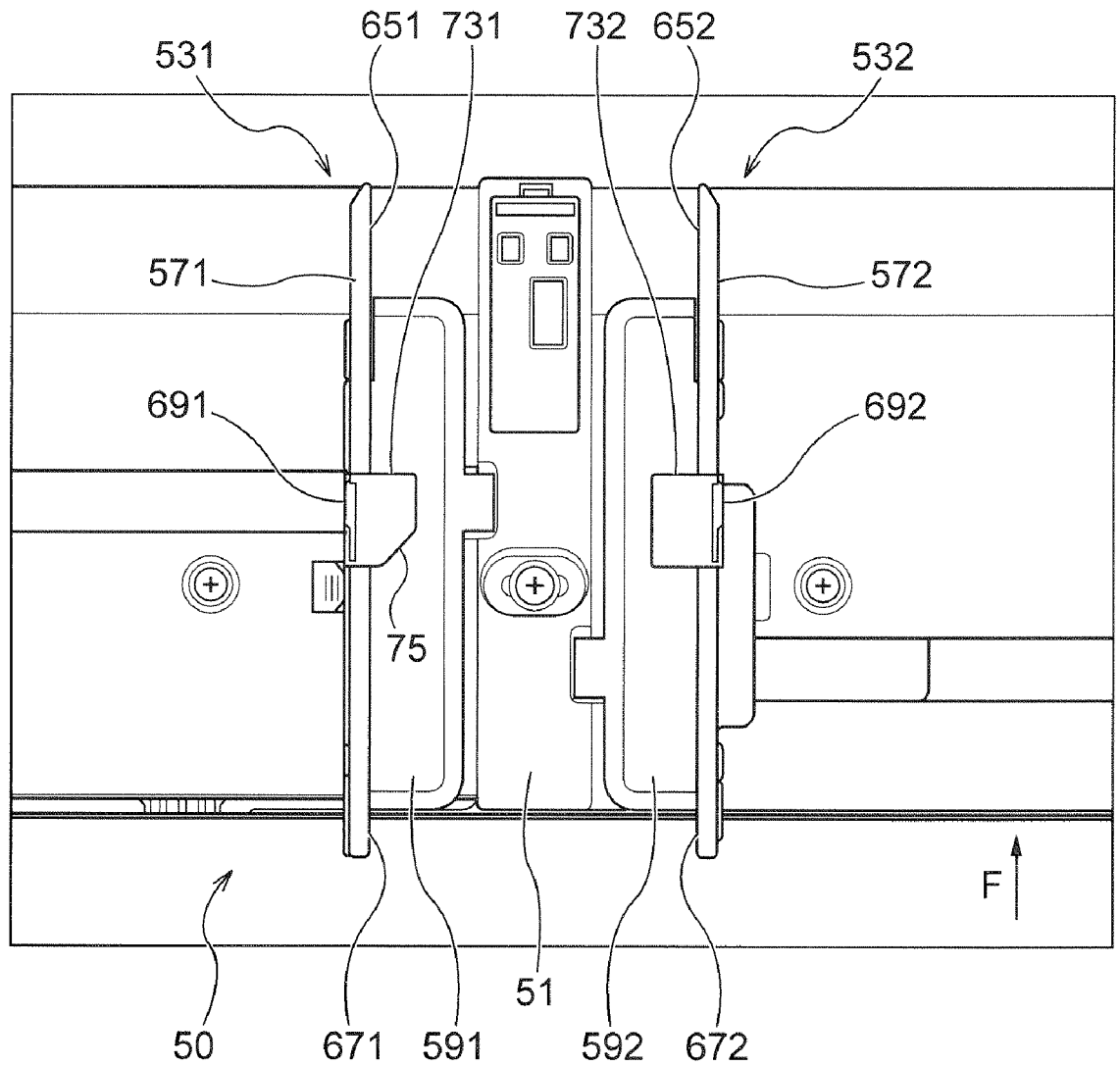
FIG. 9 is a plan view of the movable section in the first embodiment viewed from the upright direction.

In this embodiment, the movable sections 571, 572 have restriction sections 731, 732 that restrict the top surface of the medium 3 that is placed on the placement surface 51. Here, "to restrict the top surface of medium 3" means that the structure is such that the upper limit of the number of sheets of medium 3 to be placed is determined by the height position of the restriction sections 731, 732, which face the top surface of medium 3. The restriction sections 731, 732 are located at the tip ends of the protruding contact portions 691, 692. When the placement tray 50 is switched to the closed state, the restriction sections 731, 732, which are located at the tip ends of the protruding contact portions 691, 692, contact the contacted portion 71 of the device main body 34, which causes the movable sections 571, 572 to switch from the use posture to the non-use posture. In this embodiment, as shown in FIG. 9, the restriction section 731 has a notch portion 75 that is cut out along the transport direction F at the tip end in the upright direction. The notch portion 75 is provided to make it easier for the user to grip the operation section 611 and the protruding contact portion 691 in the use posture.

Figure 11:
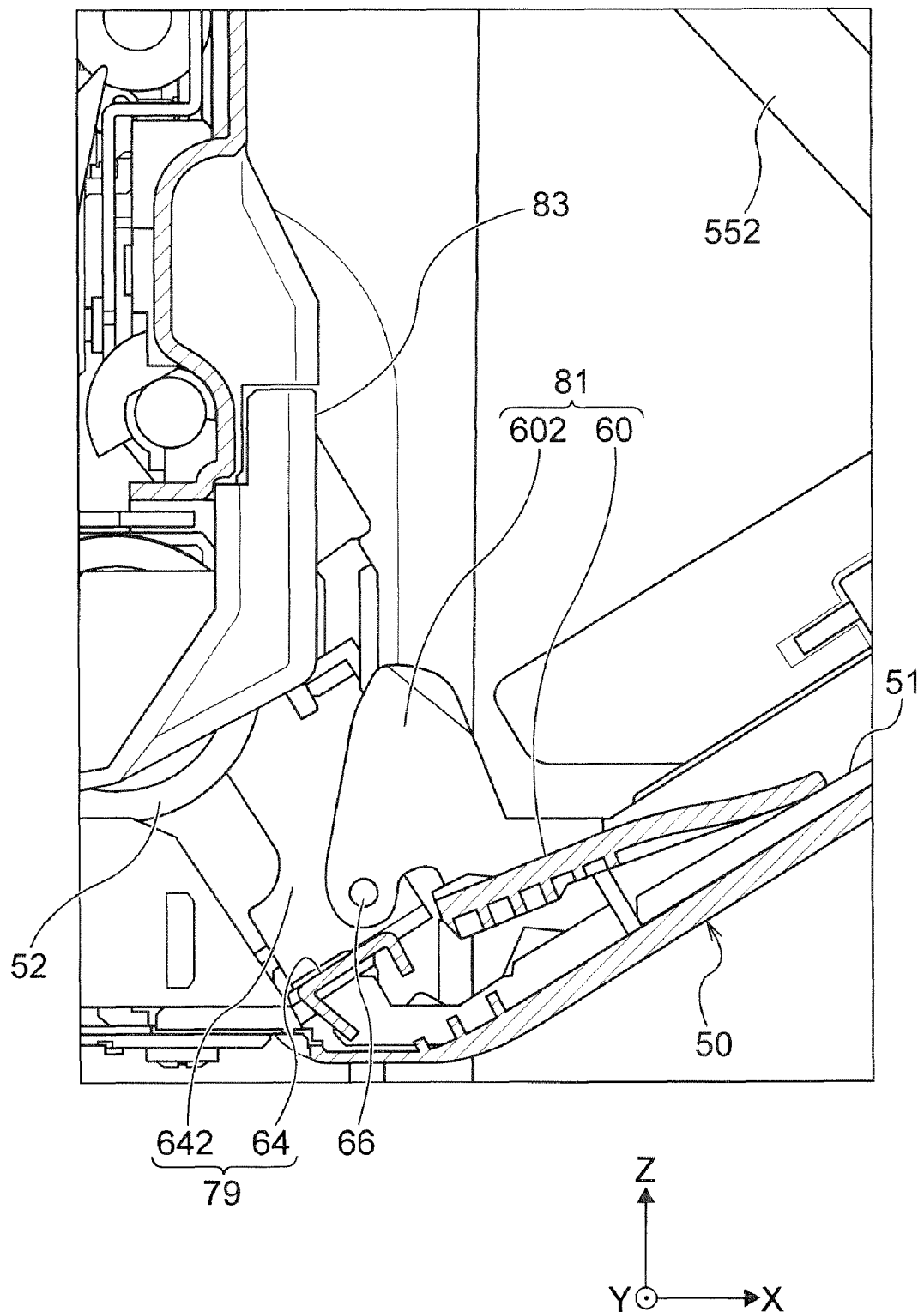
FIG. 11 is a cross-sectional view of a main part showing a structure of the portion of the auxiliary support member in the first embodiment.

In this embodiment, as shown in FIGS. 3 and 11, a raising and lowering section 79, that is, a hopper 79, is provided in the path 94 (FIG. 2) between the placement tray 50 and the pair of the feed roller 52 and the separation roller 54 in the device main body 34 to raise and lower the medium 3 toward the feed roller 52. The hopper 79 has a support surface section 64 that supports the transported medium 3 from below, and a pair of arm sections 641, 642 located at both end portions of the support surface section 64 in the width direction (Y-axis direction). Note that one arm section 641 is omitted from the figure to avoid complicating the drawing. In this embodiment, the hopper 79 is downsized. This configuration creates a gap between the placement tray 50 and the hopper 79. In order to prevent the medium 3 from falling into the gap, an auxiliary support member 81 is provided upstream of the hopper 79 in the transport direction F. The auxiliary support member 81 has a support surface section 60 that supports the medium 3 together with the placement surface 51, and a pair of arm sections 601, 602 located at both end portions of the support surface section 60 in the width direction (Y-axis direction).

Figure 12:
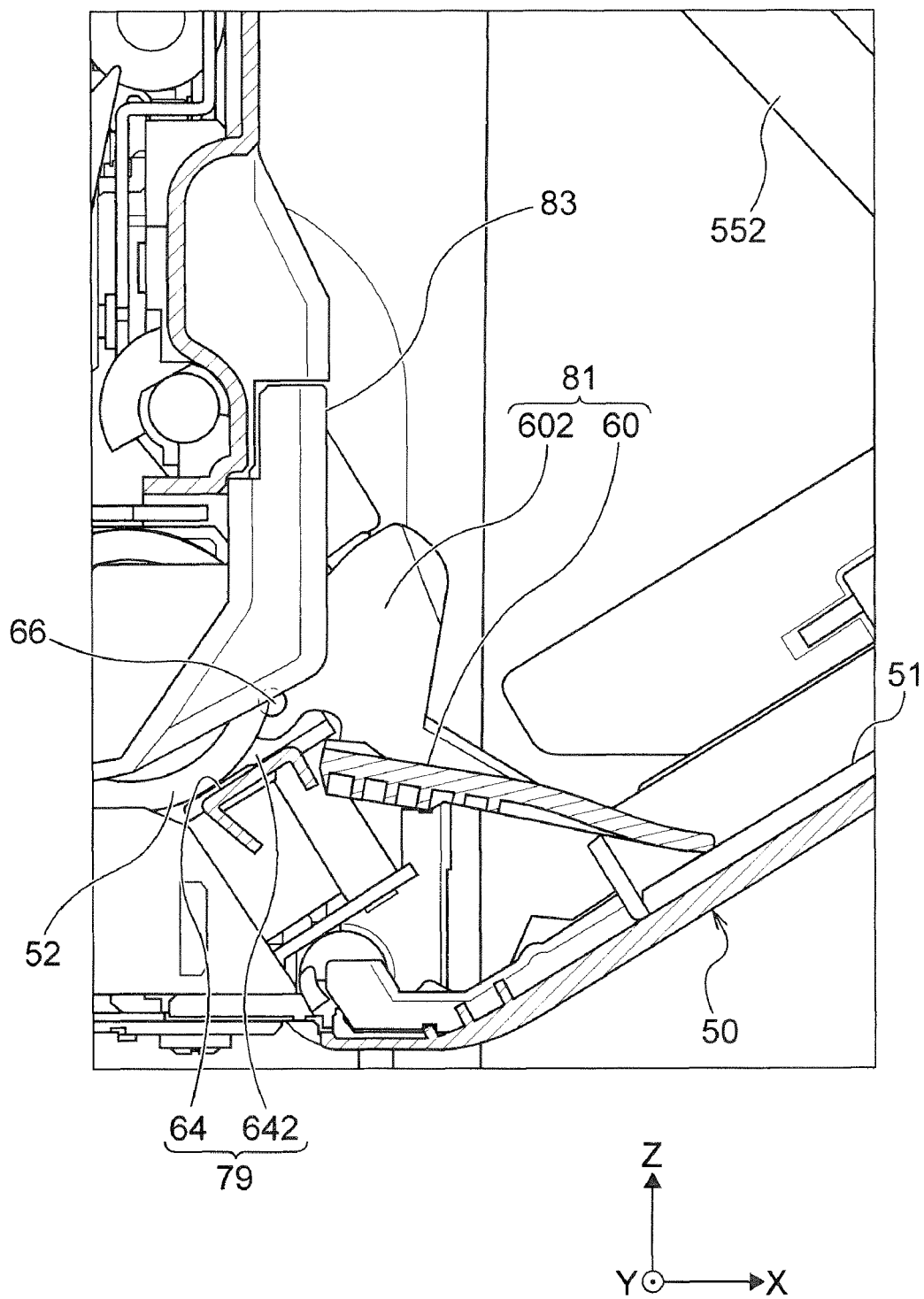
FIG. 12 is another cross-sectional view of the main part showing the structure of the portion of the auxiliary support member in the first embodiment.
Figure 13:
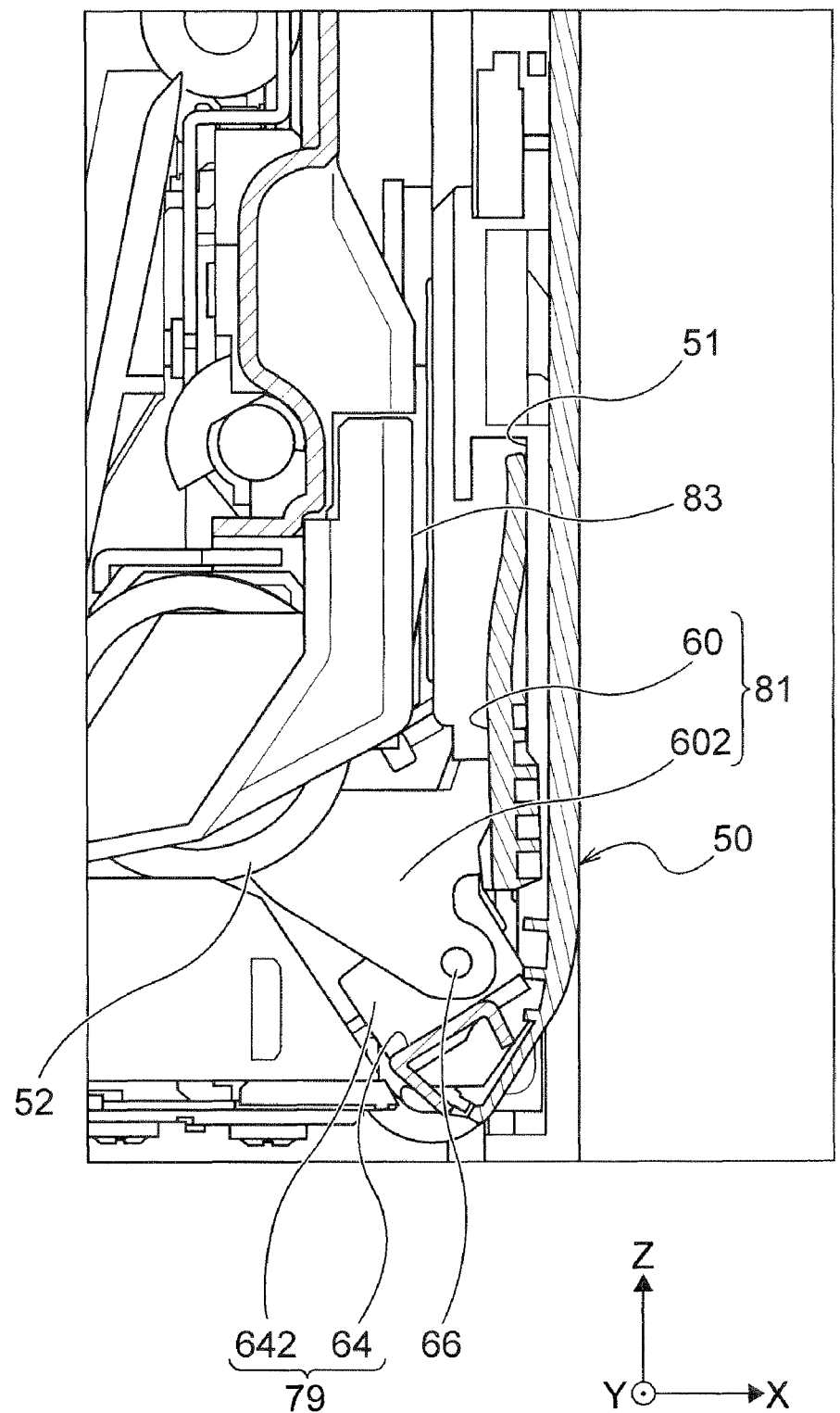
FIG. 13 is still another cross-sectional view of the main part showing the structure of the portion of the auxiliary support member in the first embodiment.

The hopper 79 and the auxiliary support member 81 are connected via a shaft 66 and are configured to be displaceable between the states shown in FIGS. 3 and 11 and the state shown in FIG. 12. FIGS. 3 and 11 show a state in which the hopper 79 is lowered. FIG. 12 shows a state in which the hopper 79 is raised. When the hopper is in the raised state of FIG. 12, the medium 3 is supported by the support surface section 60 of the auxiliary support member 8 and the support surface section 64 of the hopper 79, which constitute the path 94, and is led to the nip position between the feed roller 52 and the separation roller 54. When the hopper 79 is in the lowered state (FIG. 11), the auxiliary support member 81 pivots around the shaft 66 as the pivot point in conjunction with the displacement of the placement tray 50 from the open state to the closed state. By this pivoting, the auxiliary support member 81 is configured to switch from the expanded posture shown in FIG. 11 to the stowed posture shown in FIG. 13.

Description of Operation of First Embodiment

When the medium 3 is to be transported via the placement tray 50, the placement tray 50 is moved from the closed state shown in FIG. 1 to the open state shown in FIG. 3. The elastic force of the torsion coil spring or other elastic member automatically changes the movable sections 571, 572 of the edge guides 531, 532 from non-use posture (FIG. 7B), which is the closed state, to use posture (FIG. 7A), which is the upright state with respect to the placement surface 51. If the width of the medium 3 to be placed on the placement tray 50 does not match the position of the edge guides 531, 532, the user manually moves the operation section 611 of the edge guides 531, 532 to match the width of that medium 3, for example to the state shown in FIG. 4. At this time, the link member 551 is in front of the operation section 611, but since the operation section 611 has the exposed portion 76 (FIG. 6A), the user can easily manually move it by operating the exposed portion 76.

When the use of the placement tray 50 is finished, the medium 3 remaining on the placement surface 51 is removed, and the placement tray 50 is shifted from the open state to the closed state. At this time, the tip end portions of the protruding contact portions 691, 692 of the movable sections 571, 572 of the edge guides 531, 532 first contact the contacted portion 71 of the device main body 34. Here, the restriction sections 731, 732, which are located at the tip end portions of the protruding contact portions 691, 692, first contact the contacted portion 71 of device main body 34. When the placement tray 50 is further closed in this state, the movable sections 571, 572 are pushed by the contacted portion 71 via the protruding contact portions 691, 692. The movable sections 571, 572 pivot and change from the state shown in FIG. 7A to the state shown in FIG. 7B. In other words, the movable sections 571, 572 become in the non-use posture in which the movable sections 571, 572 recline along the placement surface 51.

Description of Effects of First Embodiment (1) In this embodiment, the operation section 611 is provided in the position overlapping the movable section 571 and at least partially not overlapping the link member 551, as viewed from the widthwise direction (Y-axis direction) that intersects the transport direction F in which medium 3 is transported. By this, the operation section 611 can have the exposed portion 76 that does not overlap with the link member 551 as viewed from the width direction. Therefore, the user can easily see the operation section 611 and thus easily grip it.

(2) The user often operates the edge guides 531, 532 from the front side of the device main body 34. In this embodiment, the edge guide 531 with the operation section 611, which is operated by the user, is provided on the front surface side of the device main body 34 in the depth direction (X-axis direction) from the front surface to the rear surface. By this, the user is able to see and operate the operation section 611 from the front side of the device main body 34. Thus, the user can easily grip the operation section 611 and operate it.

(3) In this embodiment, the link member 551 corresponding to the operation section 611 operated by the user is located downstream side of the operation section 611 in the transport direction F as viewed from the width direction. By this, the user's hand and the link member 551 are less likely to interfere with each other when the user grips the operation section 611. Thus, the user's operability is improved.

(4) Considering the support strength of the placement tray 50 by the link member 551, the connection position where the link member 551 connects with the placement tray 50 is desirably on the upstream side in the transport direction F. However, in that case, the link member 551 and the operation section 611 overlap, and the device becomes larger. In this embodiment, the link member 551 corresponding to the operation section 611 operated by the user has a curved section 63 that is curved toward the transport direction F as viewed from the width direction. By this, it is possible to achieve a structure that does not overlap with the operation section 611, while improving the design freedom of the connection position where the link member 551 connects with the placement tray 50.

(5) In this embodiment, the operation sections 611, 612 support the posture of the movable sections 571, 572 by contacting the movable sections 571, 572 when the movable sections 571, 572 are in the use posture. By this, the posture of the movable sections 571, 572 is stabilized because the operation sections 611, 612 support the posture of the movable sections 571, 572.

(6) In this embodiment, when the placement tray 50 is switched to the closed state, the restriction sections 731, 732 contact the device main body 34, then the movable sections 571, 572 are switched from the use posture to the non-use posture. By this, the user does not need to switch the posture of the movable sections 571, 572, which improves the user's operability. Further, in addition to the original function of the restricting sections 731, 732, the restriction sections 731, 732 can also serve a function of changing the posture of the movable sections 571, 572. Therefore, the device can be downsized without increasing the number of parts.

(7) In this embodiment, the restriction section 731 has a notch portion 75 that is cut out along the transport direction. Therefore, the notch portion 75 reduces the possibility of the restriction section 731 interfering with the user's hand when the user grips and operates the movable section 751 and the operation section 611.

(8) In this embodiment, the raising and lowering section 79 and the auxiliary support member 81 are provided, and the auxiliary support member 81 switches from the expanded posture (FIG. 11) to the stowed posture (FIG. 13) in conjunction with the displacement of the placement tray 50 from the open state to the closed state. By this, even if the raising and lowering section 70 is downsized and a gap is created between the placement tray 50 and the raising and lowering section 79, the auxiliary support member 81 covers that gap and reduces the possibility of the medium 3 falling into that gap. Since the auxiliary support member 81 switches from the expanded posture to the stowed posture, when the placement tray 50 is shifted to the closed state, that is, when the placement tray 50 is stowed, the auxiliary support member 81 is switches to the stowed posture, thereby the operability improves and the device can be downsized.

Second Embodiment

Figure 10A:
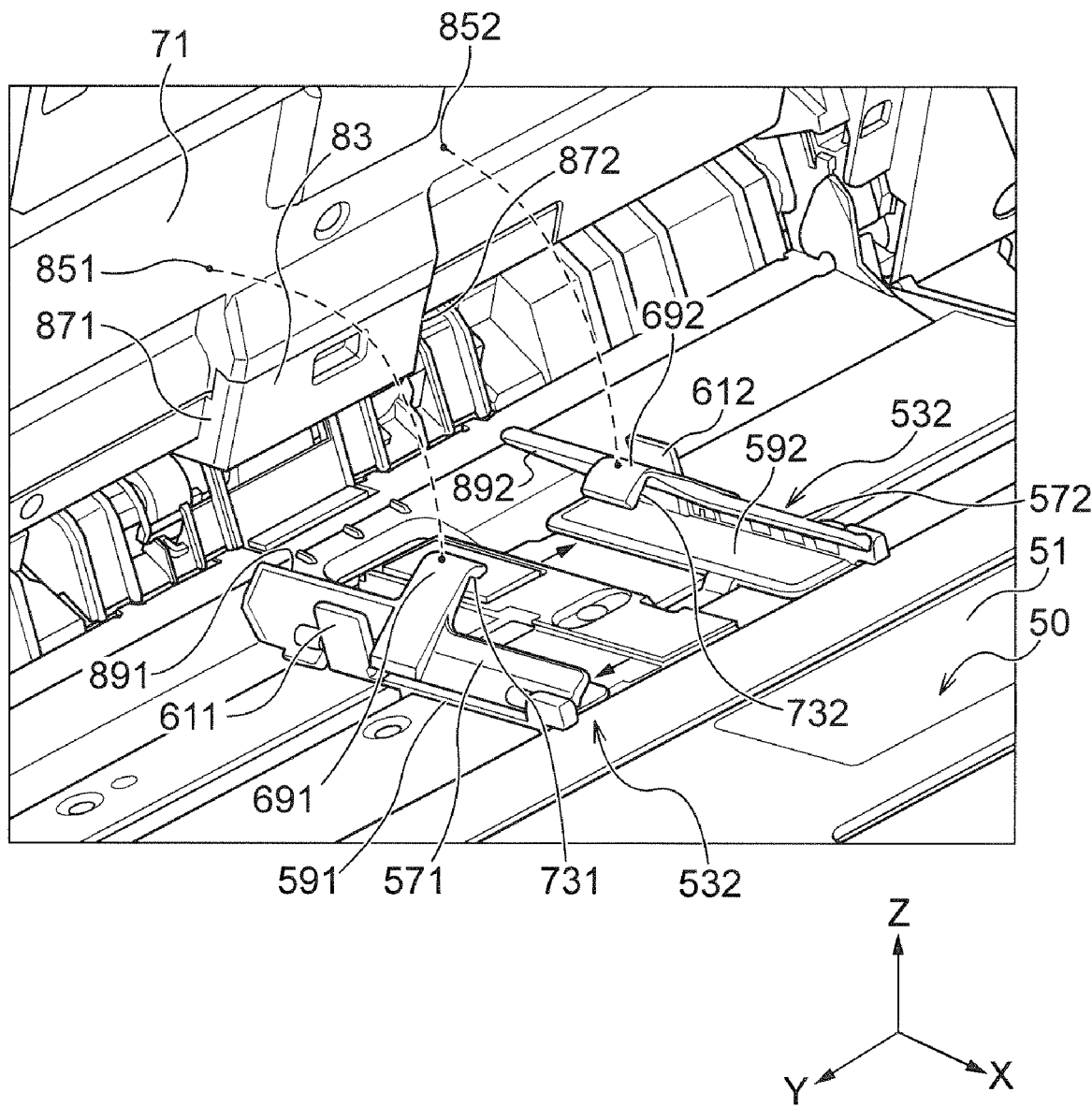
FIG. 10A is a key perspective view showing the posture change of the movable section in a second embodiment.

Next, a placement tray 50 according to the second embodiment will be described with reference to FIGS. 5, 10A, and 10B. The same symbols are used for portions identical to those in the first embodiment, and a description of their configuration and corresponding effects will be omitted. The placement tray 50 in the second embodiment is equipped with the placement surface 51 on which the medium 3 is placed, the edge guides 531, 532 that restrict the side edges 31, 32 of the medium 3 placed on the placement surface 51, and the link members 551, 552 that are connected to the device main body 34 and that support the placement tray 50 in the open state. The edge guides 531, 532 have the moveable sections 571, 572 that can pivotably switch between the non-use posture in which the movable sections recline along the placement surface 51 in the closed state of the placement tray 50 and the use posture in which the movable sections are upright with respect to the placement surface 51 in the open state, and the operation sections 611, 612 that have a fixed posture with respect to the placement surface 51 and operated by the user. The movable sections 571, 572 have the medium guide sections 671, 672 having guide surfaces 651, 652 that extend in the transport direction F of the medium 3 and that guide the medium 3 transported on the placement surface 51 in the transport direction F, and the protruding contact portions 691, 692 that protrude from the medium guide sections 671, 672 to extend in the upright direction of the movable sections 571, 572. When the placement tray 50 is shifted from the open state to the closed state, the protruding contact portions 691, 692 are pushed by contact with the contacted portion 71 of the device main body 34, and switch the movable sections 571, 572 from the use posture to the non-use posture.

In this embodiment, the operation sections 611, 612 have base sections 591, 592 to which the end portions of the operation sections 611, 612 are fixed. In other words, the end portions of the operation sections 611, 612 are fixed to the base sections 591, 592 in a fixed posture with respect to the placement surface 51 as portions to be operated by the user. The movable sections 571, 572 are pivotably attached to the base sections 591, 592 via the shaft sections 68, 70. Further, the operation sections 611, 612 are located in a position overlapping the movable sections 571, 572, as viewed from the width direction (Y-axis direction) that intersects the transport direction F.

In this embodiment, the device main body 34 has a main body convex portion 83. Here, the main body convex portion 83 is a convex portion on the surface that faces the placement surface 51 of the placement tray 50 due to the feed roller 52 being located inside the device main body 34. In other words, the main body convex portion 83 can be said to be a cover for the feed roller 52. When the movable sections 571, 572 are switched from the use posture to the non-use posture, the main body convex portion 83 is located in a position where it is not in contact with the protruding contact portions 691, 692 and is in contact with the medium guide sections 671, 672. In other words, the protruding contact portions 691, 692 of the movable sections 571, 572 are located at positions where they do not contact the main body convex portion 83, and the medium guide sections 671, 672 are located at positions where a part of them contact the main body convex portion 83. That is, in this embodiment, the main body convex portion 83 contacts the medium guide sections 671, 672 when the edge guide 531 and the edge guide 532 are at or near the position shown in FIG. 5, where they are the closest position, but does not contact the medium guide sections 671, 672 when they are in the position shown in FIGS. 3 and 4. When switching from the use posture to the non-use posture, the medium guide sections 671, 672 contact the main body convex portion 83. As a result, the movable sections 571, 572 are pivoted and displaced, and then the base sections 591, 592 are retracted to switch to the non-use posture. Note that "retract" means that the edge guide 531 and the edge guide 532 move in directions that separate each other.

The contacted portion 71 of the device main body 34 with which the protruding contact portions 691, 692 contact can be said to be "concave portion" with respect to the main body convex portion 83. In other words, it can be said that when the placement tray 50 is switched to the closed state, a portion of the medium guide sections 671, 672, which are different from the protruding contact portions 691, 692 and the restriction sections 731, 732 of the movable sections 571, 572, contacts the main body convex portion 83 of the device main body 34, then the edge guides 531, 532 move by retracting to a position where they face the contacted portion 71, which is a "concave portion" provided in the device main body 34.

Description of Operation of Second Embodiment

With the edge guides 531, 532 moved to the positions shown in FIG. 5, the case in which the placement tray 50 shifts from the open state to the closed state is explained with reference to FIGS. 10A and 10B. Note that the position shown in FIG. 5 is the position where the edge guides 531, 532 are moved when the smallest size paper that can be placed in the placement tray 50 is placed. In this case, the tip ends portions of the protruding contact portions 691, 692 of the movable sections 571, 572 contact the contact portions 851, 852 in the contacted portion 71. Note that if the actual state in which the tip end portions of the protruding contact portions 691, 692 are in contact with the contact portions 851, 852 of the contacted portion 71 is shown in a drawing, it would not only complicate the drawing but also make it more difficult to understand. Therefore, FIGS. 10A and 10B show the displacement of the protruding contact portions 691, 692, or the edge guides 531, 532, assuming that the placement tray 50 remains in the open state and the tip end portions of the protruding contact portions 691, 692 are in contact with the contact portions 851, 852 of the contacted portion 71. FIG. 10A shows the placement tray 50 beginning to close from the state shown in FIG. 5, at a point in time when the tip end portions of the protruding contact portions 691, 692 contact the contact portions 851, 852 of the contacted portion 71, that is, shortly after the protruding contact portion and the contacted portion come into contact. As the tip end portions of the protruding contact portions 691, 692 are pushed by the contacted portion 71, the movable sections 571, 572 begin to pivot and displace from the use posture toward the non-use posture. At the time of starting the displacement by this pivoting, the medium guide sections 671, 672 of the movable sections 571, 572 are not in contact with the main body convex portion 83. When the movable sections 571, 572 are pivoted further, the contact portions 891, 892 of the medium guide sections 671, 672 come into contact with the side portions 871, 872 of the main body convex portion 83.

Figure 10B:
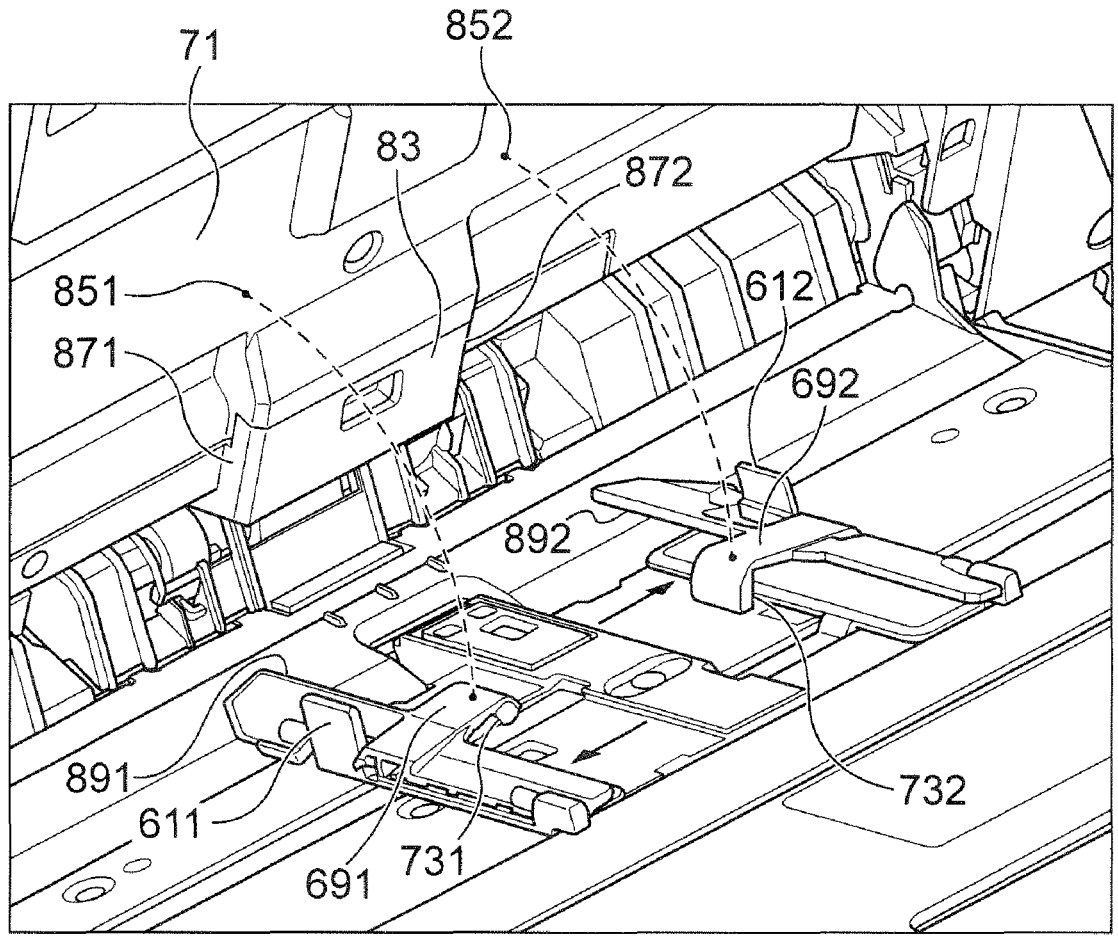
FIG. 10B is another key perspective view showing the posture change of the movable section in the second embodiment.

When the movable sections 571, 572 are pivoted further with the contact portions 891, 892 of the medium guide sections 671, 672 in contact with the side portions 871, 872 of the main body convex portion 83, then as shown in FIG. 10B, the contact portions 891, 892 of the medium guide sections 671, 672 are unable to approach each other because of the side portions 871, 872 of the main body convex portion 83. The base sections 591, 592 of the edge guides 531, 532 are free to move in the direction of approaching and separating from each other, the base sections 591, 592 retract while the movable sections 571, 572 are pivoting. That is, the edge guides 531, 532 retract in the direction away from each other, which brings them from the state shown in FIG. 10A to the state shown in FIG. 10B, which is a non-use posture. This structure to retract enables the edge guides 531, 532 to switch from the use posture to the non-use posture without interfering with the main body convex portion 83, even if the main body convex portion 83 is present.

Description of Effects of Second Embodiment (1) In this embodiment, the movable sections 571, 572 have the medium guide sections 671, 672, and the protruding contact portions 691, 692 that protrude from the medium guide sections 671, 672 to extend in the upright direction. When the placement tray 50 is shifted from the open state to the closed state, the protruding contact portions 691, 692 switch the movable sections 571, 572 from the use posture to the non-use posture by contacting the contacted portion 71 of the device main body 34. Thus, the user does not need to switch the postures of the movable sections 571, 572, which improves operability. The movable sections 571, 572 include the medium guide sections 671, 672 and the protruding contact portions 691, 692. Therefore, it is possible to reduce the size of the movable sections 571, 572, that is, the edge guides 531, 532, while maintaining the guide function as the edge guides 531, 532. Further, it is easy to achieve overall downsizing of the device by matching the edge guides 531, 532 with the concavo-convex shape of the device main body 34.

(2) Further, in this embodiment, the operation sections 611, 612 have the base sections 591, 592 to which are fixed the end portions of the operation sections 611, 612, and the operation sections 611, 612 are located in positions overlapping the movable sections 571, 572 as viewed from the width direction, which intersects the transport direction F. Thus, the operation sections 611, 612 are provided in a position overlapping the movable sections 571, 572 as viewed from the width direction. Therefore, when the user manually moves the edge guides 531, 532, they are easy to grasp and operate.

(3) In this embodiment, when switching from the use posture to the non-use posture, the medium guide sections 671, 672 contact the main body convex portion 83 on the device main body 34, which causes the movable sections 571, 572 to pivot and displace and causes the base sections 591, 592 to retract to enter the non-use posture. As a result, the movable sections 571, 572 retract so as to avoid the main body convex portion 83 and switch to the non-use posture, even if the main body convex portion 83 is present on the device main body 34. Therefore, operability can be improved, and downsizing can be achieved. In other words, when the placement tray 50 is switched to the closed state, a portion of the medium guide sections 671, 672, which are different from the protruding contact portions 691, 692 and the restriction sections 731, 732 of the movable sections 571, 572, contacts the main body convex portion 83 of the device main body 34. By this, the edge guides 531, 532 retract to a position facing the contacted portion 71, which is a "concave portion" in the device main body 34. By this, improved operability can be achieved. Even if the main body convex portion 83 is present on the device main body 34, downsizing can be achieved.

Third Embodiment

Figure 14:
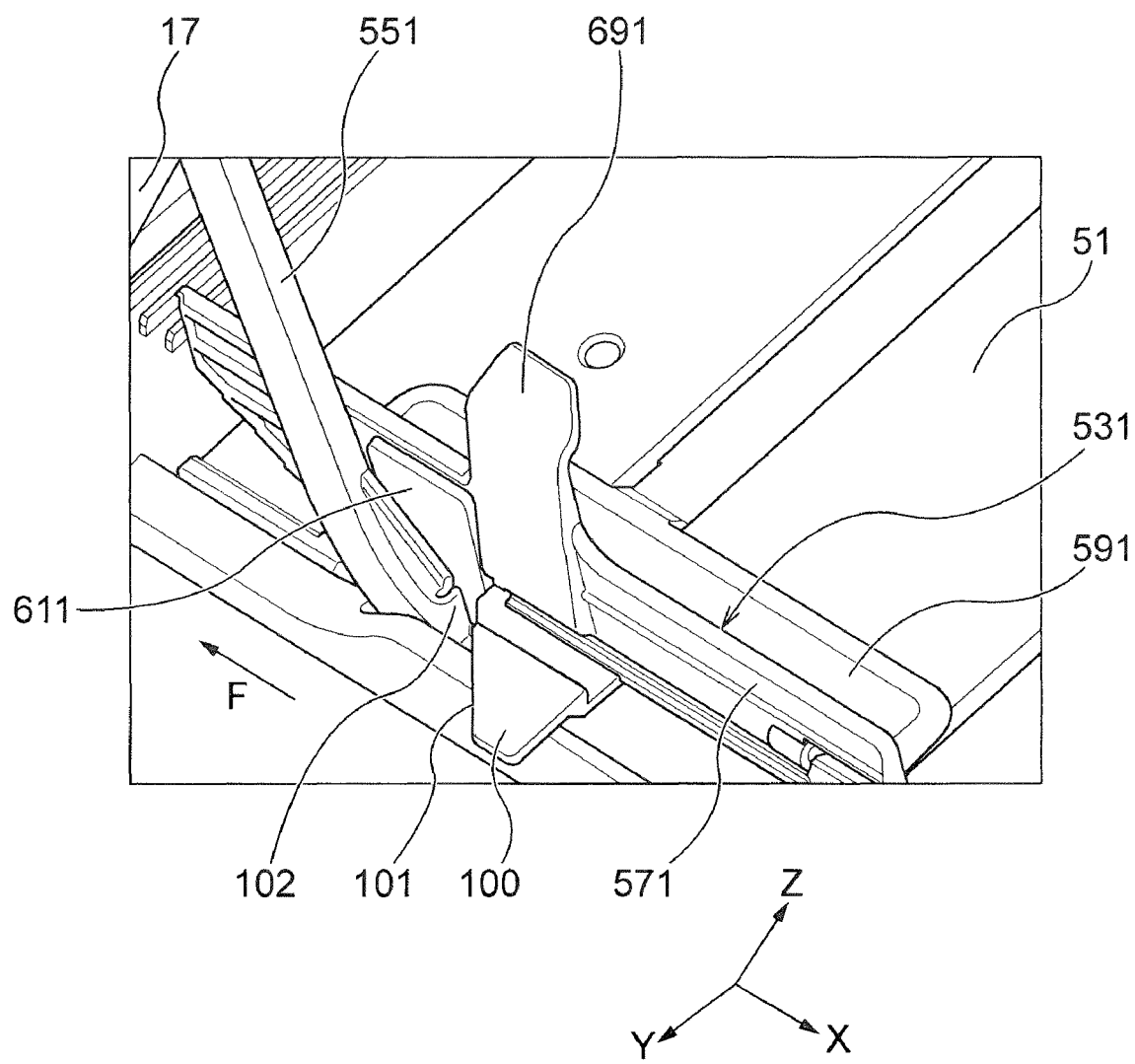
FIG. 14 is a perspective view of a main part for explaining the posture change of the movable section of the edge guide in a third embodiment.
Figure 15:
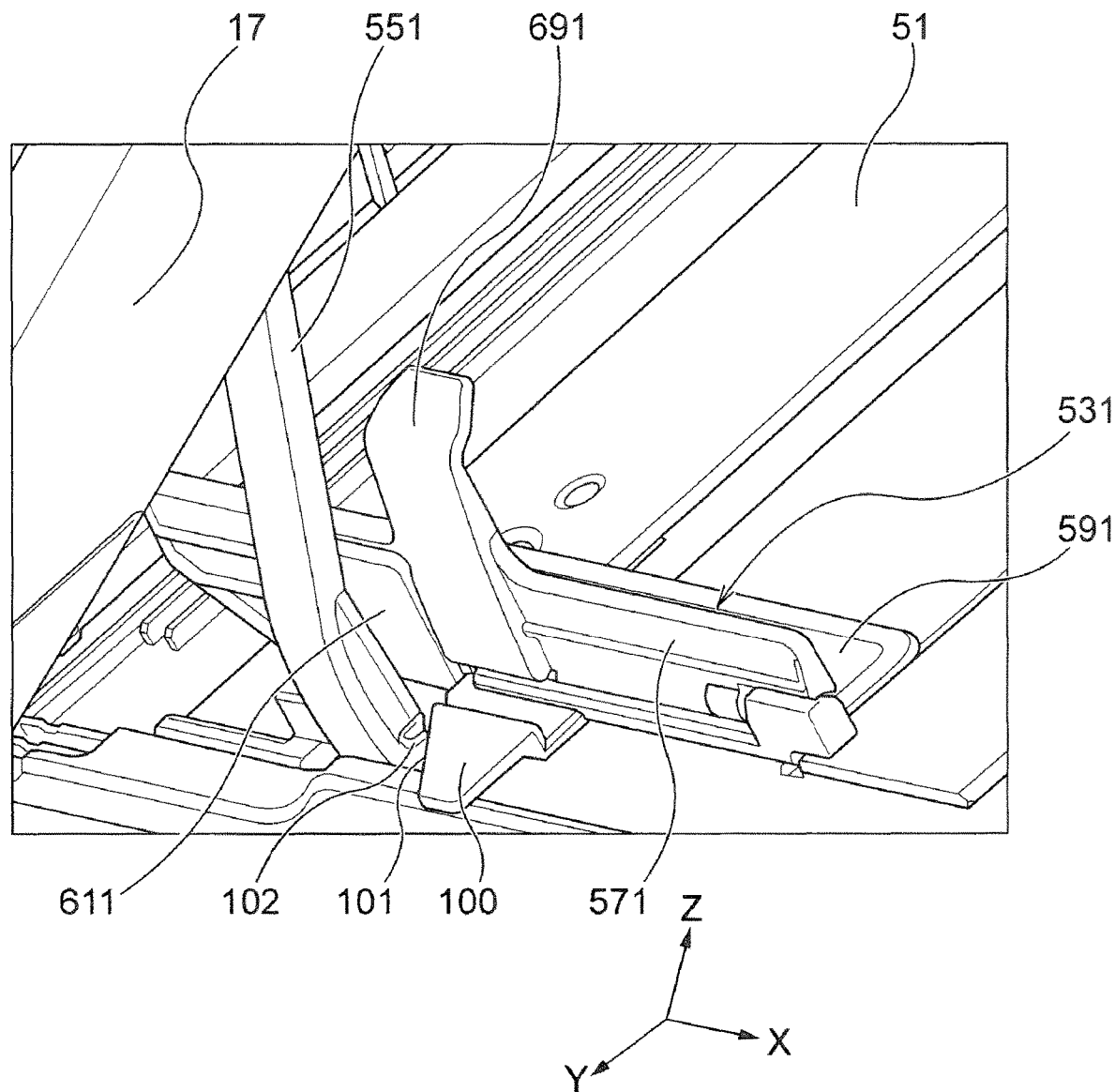
FIG. 15 is another perspective view of the main part for explaining the posture change of the movable section of the edge guide in the third embodiment.
Figure 16:
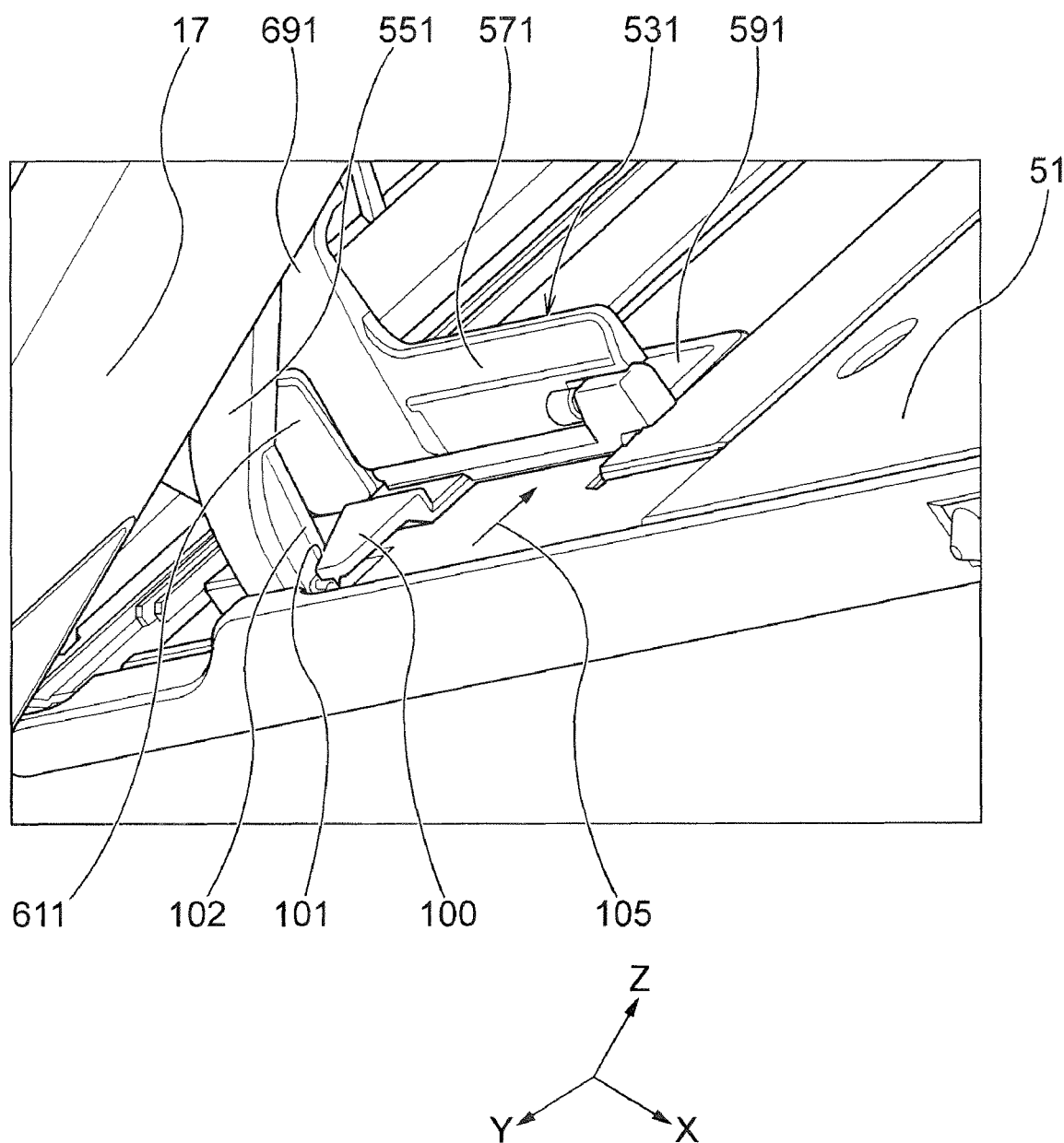
FIG. 16 is still another perspective view of the main part for explaining the posture change of the movable section of the edge guide in the third embodiment.

Next, a placement tray 50 according to a third embodiment will be described with reference to FIGS. 14 to 16. The same symbols are used for portions identical to those in the first and second embodiments, and the description of their configuration and the corresponding effects will be omitted. In this embodiment, the operation section 611 has a contact portion 100 that can contact the link member 551. The link member 551 is configured to advance and move the base section 591 by pushing the contact portion 100 when the placement tray 50 shifts from the open state to the closed state. The term "advance and move" means that the edge guide 531 and the edge guide 532 move in a direction approaching each other. That is, the movement of the edge guide 531 over the placement surface 51 in a direction separating it from the link member 551 is referred to as "advance and move". FIG. 14 shows the placement tray 50 in the open state, and the link member 551 is not in contact with the contact portion 100. FIG. 15 shows the placement tray 50 beginning to shift from the open state to the closed state, with the link member 551 contacting the contact portion 100. FIG. 16 shows the placement tray 50 shifting further from the state of FIG. 15 to the closed state, with the link member 551 contacting the contact portion 100 and pushing the contact portion 100 further.

Specifically, the contact portion 100 has a sloping edge 101 on a side facing the link member 551. The link member 551 has a push portion 102 that contacts the sloping edge 101 and that pushes the sloping edge 101. When the placement tray 50 is shifted from the open state to the closed state, the push portion 102 is configured to slide upward (in the +Z direction), with the upper base end of the link member 551 connected to the device main body 34, to contact and push the sloping edge 101. As shown in FIGS. 15 and 16, when the sloping edge 101 is pushed by the push portion 102, a contact position of the sloping edge 101 with the push portion 102 moves along the sloping direction of the sloping edge 101. As a result, the operation section 611, that is, the base section 591, moves in the direction of arrow 105, which is the direction moving away from the link member 551. That is, the base section 591 advances and moves. In other words, the sloping direction of the sloping edge 101 is set to achieve the aforementioned advance and move. In this embodiment, the other operation section 612, like the operation section 611, also has a contact portion 100 that can contact the link member 552. The contact portion 100 of the other operation section 612 has the same structure and operation as the contact portion 100 of the operation section 611, thus its description is omitted.

In this embodiment, when the placement tray 50 shifts from the open state to the closed state, the link member 551 pushes the contact portion 100, causing the base section 591 to advance and move in the direction of the arrow 105. In some cases, a convex portion protruding in the direction of the placement surface 51 of the placement tray 50 is provided near the link member 551 in the device main body 34. In this case, if the placement tray 50 is shifted from the open state to the closed state while the edge guide 531 is in a position close to the link member 551, the edge guide 531 may not be shifted from the upright use posture to the reclining non-use posture due to interference of the edge guide 531 with the convex portion on the device main body 34. However, in this embodiment, it is possible to move the edge guide 531 to a position where it does not interfere with the convex portion by the aforementioned advance and move. By this, even when the placement tray 50 is shifted from the open state to the closed state while the edge guide 531 is in the position close to the link member 551, the edge guide 531 can be shifted to the non-use posture, avoiding interference with the convex portion.

Figure 17:
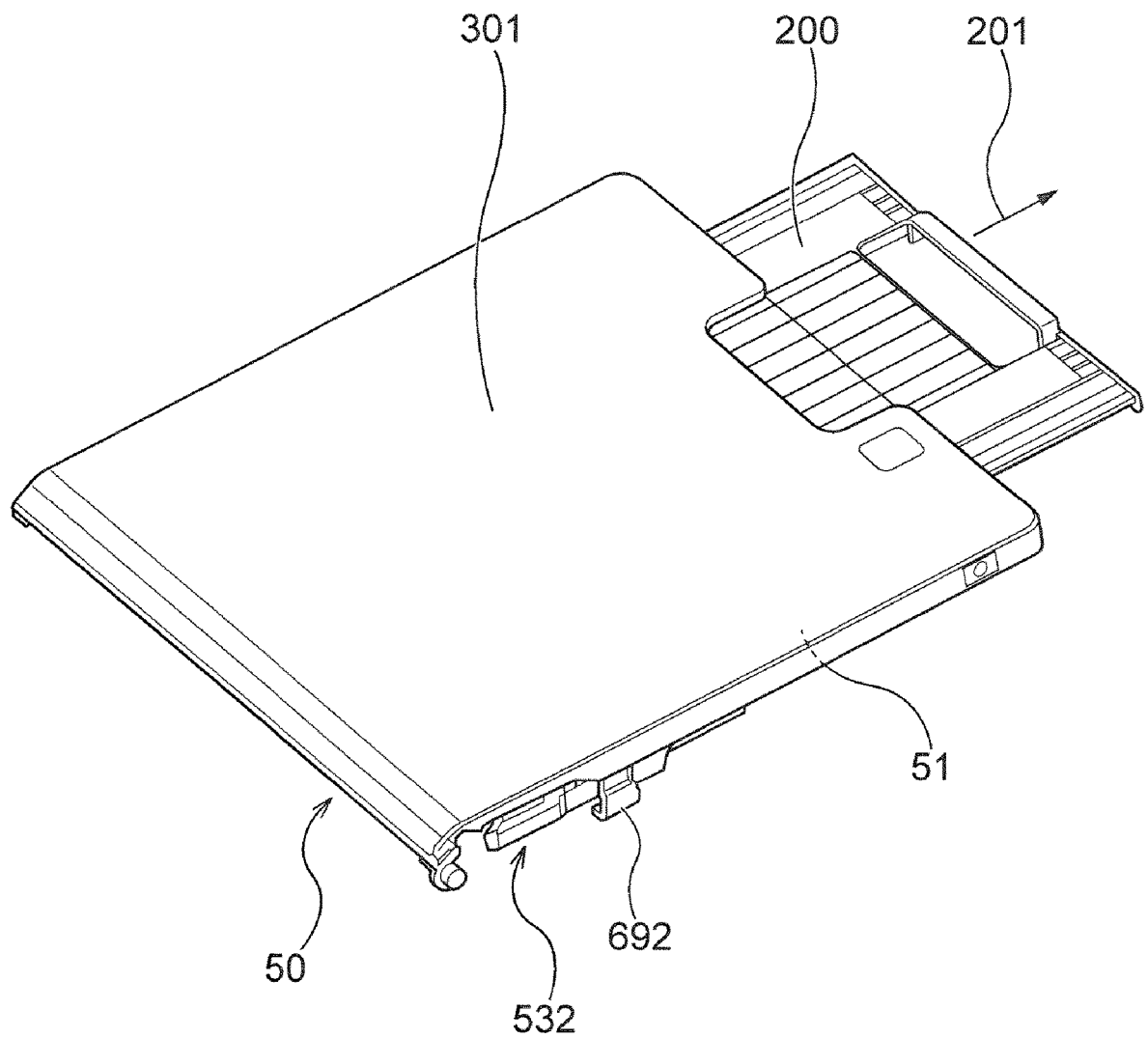
FIG. 17 is a perspective view of the placement tray and an extension section pulled out to the intermediate position.
Figure 18:
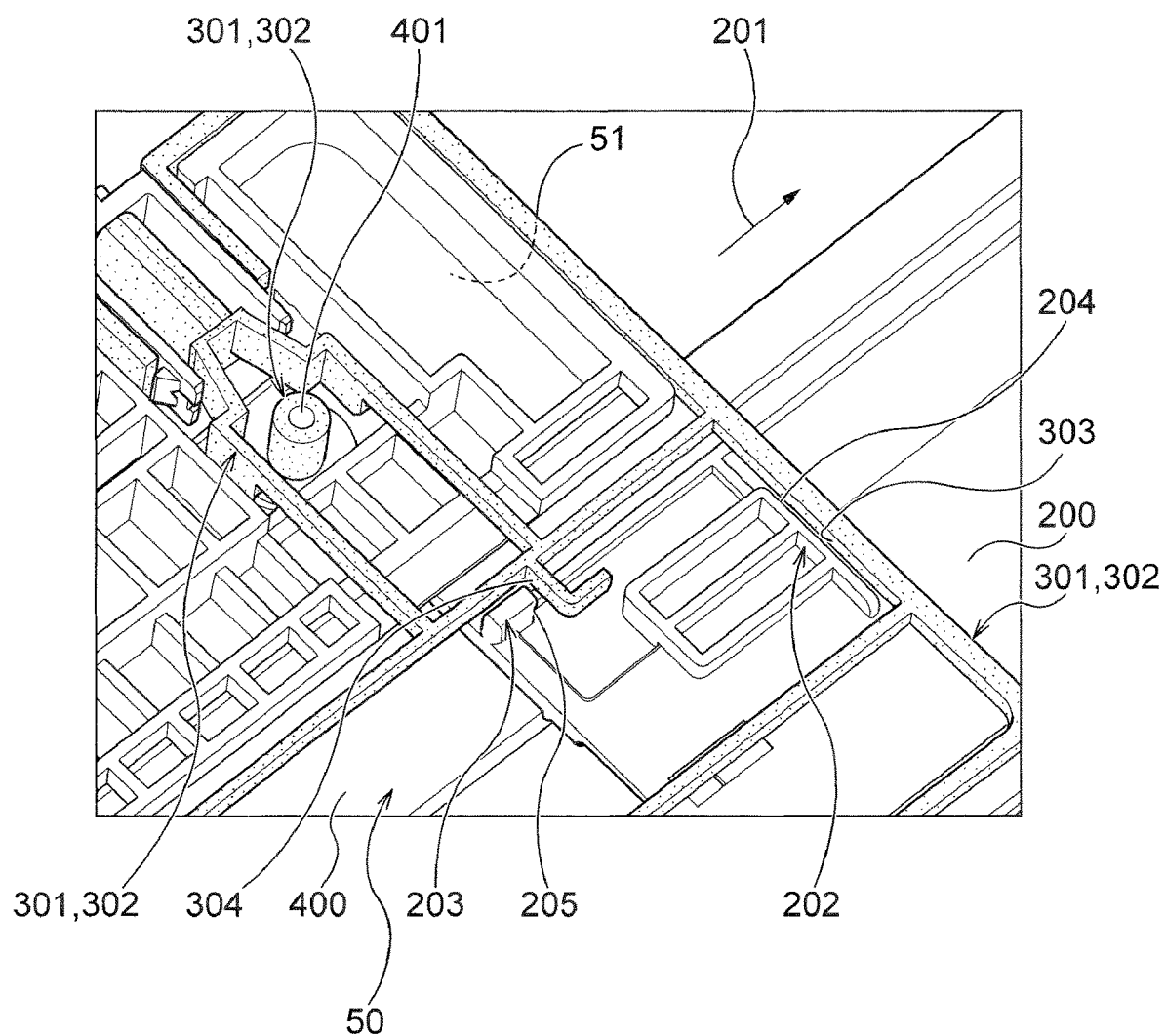
FIG. 18 is a perspective view of the main part of the placement tray and the pulled-out extension section, which shows the structure that prevents them from being pulled out.

Other Structure: Structure to Prevent the Extension Section of the Placement Tray from Falling Out The structure for preventing an extension section 200 of the placement tray 50 from falling out is described with reference to FIGS. 17 and 18. The area of the placement surface 51 can be expanded by pulling out the extension section 200, as indicated by arrow 201, which indicates the pullout direction in FIG. 17. As shown in FIG. 18, the extension section 200 has a first stopper 202 and a second stopper 203, which are convex shape, at the rear end in the pullout direction 201 of the extension section 20. The second stopper 203 is located at the rearmost end of the extension section 200, and the first stopper 202 is located a little farther forward in the pullout direction than is the second stopper 203. The tray main body 400 having the placement surface 51 of the placement tray 50 is covered on the opposite surface to the placement surface 51 by a back cover 301. The tray main body 400 and the back cover 301 are fastened together by a screw 401 inserted from the placement surface 51 side of the tray main body 400. In FIG. 18, only reinforcing ribs 302 on the inner surface of the back cover 301 are drawn so that the interior can be seen, and the other portions are omitted.

The inner surface of the back cover 301, that is, the surface facing the extension section 200, is provided with a first engaged portion 303 and a second engaged portion 304. In this embodiment, the first engaged portion 303 and the second engaged portion 304 are provided on the reinforcing ribs 302. When the extension section 200 is pulled out, a contact portion 204 of the first stopper 202 contacts the first engaged portion 303 to stop the first stopper 202. Further, a contact portion 205 of the second stopper 203 contacts the second engaged portion 304 to stop the second stopper 203. That is, the extension section 200 is designed to prevent the extension section 200 from falling out at two locations where the first engaged portion 303 and the second engaged portion 304, which are located apart in the pullout direction 201, are positioned. Further, as shown in FIG. 18, the screw 401 is positioned slightly further back than the first engaged portion 303 in the pullout direction. The second engaged portion 304 is positioned at substantially the same position as the fastening position of the screw 401 in the pullout direction. By this, the strength of the second engaged portion 304 against deformation is improved, and the certainty of preventing the second engaged portion 304 from being pulled out is enhanced.

Other Embodiments

The placement tray 50 and the recording device 1 equipped with the placement tray 50 according to this disclosure are based on the configuration described above in the embodiments, but it is of course possible to change or omit portions of the configuration to the extent that it does not depart from the gist of the present disclosure. The above embodiment describes an inkjet printer as one equipped with a placement tray 50, but it could be anything other than this printer. That is, it can be applied to other devices with a placement tray 50 that transports medium 3. In the above embodiment, both edge guides 531, 532 are described as moving, but the disclosure can also be applied to a structure in which only one edge guide 531 is movable and the other edge guide 532 is not.

What is claimed is:

1. A placement tray provided so as to be displaceable between a closed state and an open state with respect to a device main body, the placement tray comprising:
    a placement surface on which a medium is placed;
    an edge guide that restricts a side edge of the medium that is placed on the placement surface; and
    a link member that is connected to the device main body and that supports the placement tray in the open state, wherein
    the edge guide has
        a movable section that is configured to pivotably switch between a non-use posture in which in the closed state the movable section reclines along the placement surface and a use posture in which in the open state the movable section is upright with respect to the placement surface and
        an operation section that has a fixed posture with respect to the placement surface and that is operated by a user, and
    at least a part of the operation section is provided in a position that overlaps the movable section and that does not overlap the link member as viewed from a width direction, which intersects a transport direction in which the medium is transported.

2. The placement tray according to claim 1, wherein
    the placement tray is located on a side surface of the device main body and
    the edge guide, which has the operation section to be operated by the user, is provided on a front surface side of the device main body in a depth direction, which is from the front surface to a rear surface.

3. The placement tray according to claim 1, wherein
    at least a part of the link member corresponding to the operation section to be operated by the user is located further downstream in the transport direction than is the operation section, as viewed from the width direction.

4. The placement tray according to claim 3, wherein
    the link member corresponding to the operation section to be operated by the user has a curved section that curves toward the transport direction, as viewed from the width direction.

5. The placement tray according to claim 1, wherein
    when the movable section is in the use posture, the operation section supports a posture of the movable section by contacting the movable section.

6. The placement tray according to claim 1, wherein
    the movable section has a restriction section that restricts a top surface of the medium placed on the placement surface and
    when the placement tray switches to the closed state, the restriction section contacts the device main body, which switches the movable section from the use posture to the non-use posture.

7. The placement tray according to claim 6, wherein
    when the placement tray switches to the closed state, a portion of the movable section that is different from the restriction section contacts a main body convex portion of the device main body, which moves the edge guide to a position facing a concave portion provided in the device main body.

8. The placement tray according to claim 6, wherein
    the restriction section has a notch portion that is cut out along the transport direction.

9. The placement tray according to claim 1, further comprising:
    a raising and lowering section that raises and lowers the medium toward a feed roller provided in the device main body and
    an auxiliary support member that is provided upstream of the raising and lowering section in the transport direction, and that supports the placement surface and the medium that is placed on the placement surface, wherein in conjunction with displacement of the placement tray from the open state to the closed state, the auxiliary support member switches from an expanded posture to a stowed posture.

10. A recording device, comprising:
the placement tray according to claim 1;
a transport section that transports a medium placed on the placement tray; and
a recording section that performs recording on the medium being transported by the transport section.

11. A placement tray that is displaceable between a closed state and an open state with respect to a device main body, the placement tray comprising:
a placement surface on which a medium is placed;
an edge guide that restricts a side edge of the medium that is placed on the placement surface; and
a link member that is connected to the device main body and that supports the placement tray in the open state, wherein
the edge guide has
 a movable section that is configured to pivotably switch between a non-use posture in which in the closed state the movable section reclines along the placement surface and a use posture in which in the open state the movable section is upright with respect to the placement surface and
 an operation section that has a fixed posture with respect to the placement surface and that is operated by a user, and
the movable section has
 a medium guide section having a guide surface that extends in a transport direction of the medium and that guides the medium being transported in the transport direction and
 a protruding contact portion that protrudes from the medium guide section so as to extend in an upright direction and that, when the open state is shifted to the closed state, switches the movable section from the use posture to the non-use posture by contacting a contacted portion of the device main body.

12. The placement tray according to claim 11, wherein the operation section
 has a base section to which an end portion of the operation section is fixed and
 is provided in a position that overlaps the movable section as viewed from a width direction that intersects the transport direction, and
the movable section is pivotably attached to the base section.

13. The placement tray according to claim 12, wherein
the device main body has a main body convex portion at a position that, when the movable section is switched from the use posture to the non-use posture, does not contact the protruding contact portion and that contacts the medium guide section and
when the use posture switches to the non-use posture, the medium guide section contacts the main body convex portion, which, by adding to the displacement by pivoting, retracts the base section, which switches the movable section to the non-use posture.

14. The placement tray according to claim 12, wherein
the operation section has a contact portion that is configured to contact the link member and,
when the placement tray moves from the open state to the closed state, the link member pushes the contact portion, which advances and moves the base section.

15. The placement tray according to claim 11, further comprising:
a raising and lowering section that raises and lowers the medium toward a feed roller provided in the device main body and
an auxiliary support member that is provided upstream of the raising and lowering section in the transport direction, and that supports the placement surface and the medium that is placed on the placement surface, wherein
in conjunction with displacement of the placement tray from the open state to the closed state, the auxiliary support member switches from an expanded posture to a stowed posture.

16. A recording device, comprising:
the placement tray according to claim 11
a transport section that transports a medium placed on the placement tray; and
a recording section that performs recording on the medium being transported by the transport section.

* * * * *